United States Patent
Nobuta et al.

(10) Patent No.: US 10,926,436 B2
(45) Date of Patent: Feb. 23, 2021

(54) INJECTION MOLDING METHOD AND INJECTION MOLDING MACHINE

(71) Applicants: U-MHI PLATECH CO., LTD., Nagoya (JP); MITSUBISHI HEAVY INDUSTRIES, LTD., Tokyo (JP)

(72) Inventors: Munehiro Nobuta, Nagoya (JP); Naoki Toda, Nagoya (JP); Toshihiko Kariya, Nagoya (JP); Takeshi Yamaguchi, Nagoya (JP); Kiyoshi Kinoshita, Nagoya (JP)

(73) Assignees: UBE MACHINERY CORPORATION, LTD., Ube (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 334 days.

(21) Appl. No.: 15/528,884

(22) PCT Filed: Jun. 25, 2015

(86) PCT No.: PCT/JP2015/003202
§ 371 (c)(1),
(2) Date: May 23, 2017

(87) PCT Pub. No.: WO2016/084271
PCT Pub. Date: Jun. 2, 2016

(65) Prior Publication Data
US 2017/0312954 A1    Nov. 2, 2017

(30) Foreign Application Priority Data
Nov. 25, 2014 (JP) .............................. JP2014-238048

(51) Int. Cl.
*B29C 45/00* (2006.01)
*B29C 45/76* (2006.01)
(Continued)

(52) U.S. Cl.
CPC .......... *B29C 45/0005* (2013.01); *B29B 7/484* (2013.01); *B29B 7/60* (2013.01);
(Continued)

(58) Field of Classification Search
CPC .................................................. B29C 45/0005
See application file for complete search history.

(56) References Cited

U.S. PATENT DOCUMENTS

2007/0108663 A1    5/2007  Yusa et al.
2011/0272847 A1   11/2011  Hehl
(Continued)

FOREIGN PATENT DOCUMENTS

| CN | 1966242 A | 5/2007 | |
| JP | 02153714 A | * 6/1990 | ......... B29C 45/1816 |

(Continued)

OTHER PUBLICATIONS

Translation of JPH02153714A, Taniguchi (Year: 1990).*
(Continued)

*Primary Examiner* — Marc C Howell
*Assistant Examiner* — Asha A Thomas
(74) *Attorney, Agent, or Firm* — Manabu Kanesaka; Kenneth Berner; Benjamin Hauptman

(57) ABSTRACT

Provided is an injection molding method for resin that contains reinforcing fiber, the method being capable of easily eliminating uneven distribution of added components. The injection molding method is provided with: a plasticizing step for supplying resin pellets P and added components to a cylinder equipped with a screw 10, which has a rotating axis as the center is capable of rotating normally and in reverse, and generating molten resin by rotating the screw 10 in the normal direction; and an injecting step for injecting the molten resin M comprising the added components into a cavity. In the plasticizing step, a reverse rotation operation (Continued)

for reversing the rotation of the screw 10 is performed or a screw-stopping operation of stopping the normal rotation of the screw 10 is performed with a prescribed timing and for a prescribed period.

18 Claims, 15 Drawing Sheets

(51) Int. Cl.
*B29B 7/90* (2006.01)
*B29B 7/60* (2006.01)
*B29B 7/48* (2006.01)
*B29C 45/50* (2006.01)
*B29C 45/18* (2006.01)

(52) U.S. Cl.
CPC ............... *B29B 7/90* (2013.01); *B29C 45/50* (2013.01); *B29C 45/76* (2013.01); *B29B 7/905* (2013.01); *B29C 45/1816* (2013.01); *B29C 2945/76605* (2013.01); *B29C 2945/76665* (2013.01); *B29C 2945/76826* (2013.01); *B29C 2945/76832* (2013.01)

(56) References Cited

U.S. PATENT DOCUMENTS

| | | | |
|---|---|---|---|
| 2013/0200552 A1* | 8/2013 | Kariya | B29C 45/60 264/328.17 |
| 2016/0009010 A1 | 1/2016 | Kariya et al. | |

FOREIGN PATENT DOCUMENTS

| | | |
|---|---|---|
| JP | H06-198688 A | 7/1994 |
| JP | H08-187754 A | 7/1996 |
| JP | 2007-007464 A | 1/2007 |
| JP | 2011-079223 A | 4/2011 |
| JP | 2012-056173 A | 3/2012 |
| JP | 2012-511445 A | 5/2012 |
| JP | 2013-241019 A | 12/2013 |
| JP | 2014-184702 A | 10/2014 |
| WO | 2014/170932 A1 | 10/2014 |

OTHER PUBLICATIONS

PCT/ISA/237, "Written Opinion of the International Searching Authority for International Application No. PCT/JP2015/003202," dated Sep. 15, 2015.
PCT/IB/338, "Notification of Transmittal of Translation of the International Preliminary Report on Patentability for International Application No. PCT/JP2015/003202," dated Jun. 8, 2017.
PCT/IB/373, "International Preliminary Report on Patentability for International Application No. PCT/JP2015/003202," dated May 30, 2017.
Japan Patent Office, "Office Action for Japanese Patent Publication No. 2015-536681," dated Nov. 18, 2015.
Japan Patent Office, "Office Action for Japanese Patent Publication No. 2015-536681," dated Feb. 17, 2016.
China Patent Office, "Office Action for Chinese Patent Application No. 201580061874.0," dated Sep. 21, 2018.

* cited by examiner

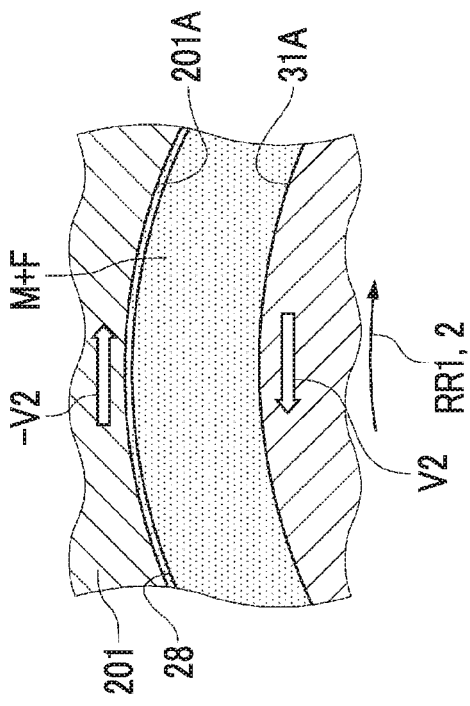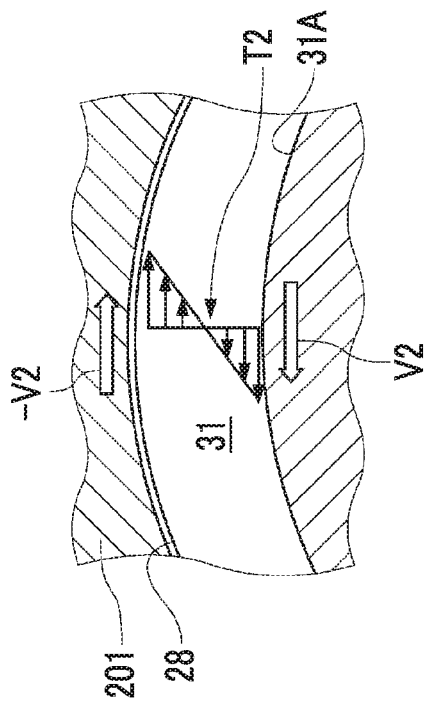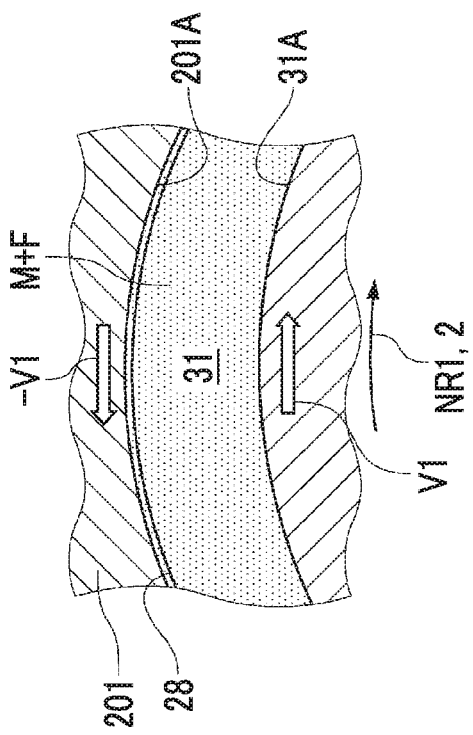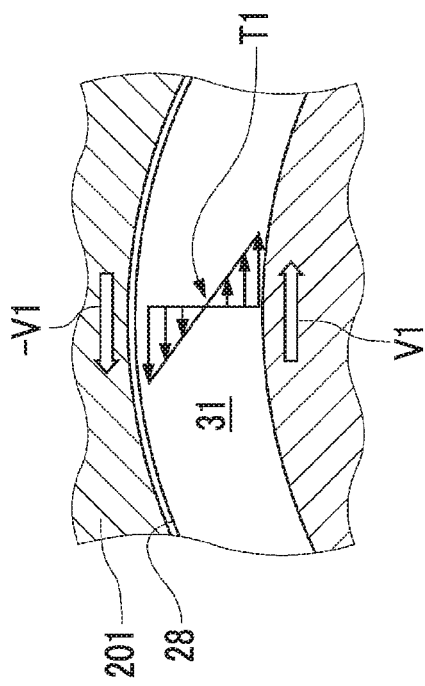

FIG. 15

INJECTION MOLDING METHOD AND INJECTION MOLDING MACHINE

RELATED APPLICATIONS

The present application is National Phase of International Application No. PCT/JP2015/003202 filed Jun. 25, 2015, and claims priority from Japanese Application No. 2014-238048, filed Nov. 25, 2014, the disclosure of which is hereby incorporated by reference herein in its entirety.

TECHNICAL FIELD

The present invention relates to injection molding for a resin that contains an added component, for example, a reinforcing fiber.

BACKGROUND ART

A high value molded product in which the strength and the function are enhanced by containing added components is used for various purposes. As a technique of acquiring the molded product through injection molding, there is a known technique in which a thermoplastic resin is molten due to the rotation of a screw inside a cylinder configuring a plasticizing apparatus, and after the added components are mixed or kneaded therewith, the result is injected into a mold of an injection molding machine.

In a case where the added components such as additives and a filling substance are mixed and kneaded with the thermoplastic resin and injection molding of a desired molded product is performed, usually, a master batch pellet which is produced by a twin-shaft extrusion molding machine and contains the added components is manufactured. Thereafter, the master batch pellet is inserted into the injection molding machine together with a desired thermoplastic resin, and a prescribed molded product is manufactured. In this method, the resin can be mixed by using only a general injection molding machine. However, since the expensive master batch is used as a raw material, the raw material cost increases. Therefore, a direct raw material supply-type injection molding machine which can directly supply the added components and in which a pellet manufacturing step can be omitted has been proposed.

However, in the direct raw material supply-type injection molding machine, since distribution mixing and dispersion mixing of the added components in the thermoplastic resin are insufficient, an injection molding machine in which the problems are improved has been proposed (PTL 1).

In addition, in order to acquire an effect of improving the strength in the added components, particularly due to reinforcing fibers, it is desired that the reinforcing fibers are uniformly dispersed in the resin. Particularly, in a case where without using a reinforcing fiber pellet in which the reinforcing fibers are impregnated with the resin raw material, in fibers in a chopped strand state cut in prescribed lengths in advance (hereinafter, will be referred to as chopped fibers) or fibers in a so-called roving state (hereinafter, will be referred to as roving fibers), each of the reinforcing fibers having the fiber lengths equal to or greater than 3 mm, and the resin raw material is supplied to the cylinder, the fibers are likely to be entangled inside the screw. Accordingly, it is not easy to open a fiber bundle which is an aggregation of the reinforcing fibers and to disperse the fibers into the resin. Therefore, in order to realize uniform dispersion of the added components, considerably significant shearing force and shearing amount may be applied thereto by using the twin-shaft extruder. However, the twin-shaft extruder is considerably expensive, and handling such as selecting the molding conditions and retaining the machine is complicated. Thus, it is not easy to perform molding (PTL and PTL 2). In addition, in order to contribute to uniform dispersion of the reinforcing fibers, there is provided a mechanism (feeder) for forcibly supplying the reinforcing fibers to the inside of the cylinder (for example, PTL 3). However, the bundle or the lump (hereinafter, will be generically named as the bundle) of the reinforcing fibers still has not been solved. Particularly, in a case of a high content rate such that the content of the reinforcing fibers is equal to or greater than 10%, it is difficult to uniformly disperse the reinforcing fibers in the resin.

CITATION LIST

Patent Literature

[PTL 1] Japanese Unexamined Patent Application Publication No. 2007-7864
[PTL 2] Japanese Unexamined Patent Application Publication No. 2012-56173
[PTL 3] PCT Japanese Translation Patent Publication No. 2012-511445

SUMMARY OF INVENTION

Technical Problem

An object of the present invention is to provide an injection molding method for a resin that contains reinforcing fibers. In generation of a molten resin for reinforcing fiber molding, in which added components, particularly reinforcing fibers having fiber lengths equal to or greater than 3 mm and a resin raw material are supplied to the inside of a cylinder, uneven distribution of the reinforcing fibers can be easily eliminated by using a simple single-shaft plasticizing screw.

In addition, another object of the present invention is to provide an injection molding apparatus that realizes the injection molding method.

Solution to Problem

The inventors have performed an examination particularly regarding reinforcing fibers among added components in which uneven distribution is most likely to occur, and have obtained one conclusion. That is, in a plasticizing step of injection molding, as illustrated in FIG. 13, in a screw groove 301 between flights 306 of an injection molding screw 300 which is disposed inside a cylinder 310, a fiber bundle which is an aggregation of multiple reinforcing fibers F is present on a pull-side 303 of the flight, and a molten resin M is present on a push-side 305 of the flight separately from each other. Since the viscosity of the molten resin M is comparatively high and the molten resin M cannot invade the inside of the fiber bundle, a shearing force which uses the molten resin M as a medium and is caused due to the rotation of the screw 300 is not transmitted to the inside of the fiber bundle. Accordingly, opening of the fiber bundle does not proceed. Therefore, since the reinforcing fibers F are subjected to injection molding in a form of the fiber bundle, the reinforcing fibers F are unevenly distributed in a molded product. The outlined arrow in FIG. 13(a) indicates the orientation in which the screw 300 rotates (will be referred to as the normal rotation), and the outlined arrows in FIG.

13(c) indicate relative moving directions of the screw 300 and the cylinder 310 in the axial direction and the circumferential direction in accordance with the rotation of the screw 300. The similar configuration will also be applied to the below-described embodiment. In addition, in the present invention, in the plasticizing step, the orientation in which the screw rotates in order to melt a resin raw material will be referred to as the normal rotation.

The inventor has conceived an idea of promoting opening of the fiber bundle by halting a rotational flow caused due to the normal rotation of the screw inside the screw groove 301 or generating a rotational flow in the molten resin M in an orientation different from the orientation of the rotational flow caused due to the normal rotation, and causing the shearing force generated by changing the state of a flow of the molten resin M to act on the fiber bundle in addition to the shearing force generated by the normal rotation of the screw.

In other words, according to the present invention, there is provided an injection molding method for a resin composition that contains an added component. The method includes a plasticizing step of supplying a resin raw material and the added component to a cylinder which is able to rotate normally and reversely around a rotating axis and is equipped with a screw which is able to advance and retreat along the rotating axis, and generating a molten resin through a normal rotation operation of the screw; and an injecting step of injecting the molten resin which contains a reinforcing fiber by causing the screw to advance. In the plasticizing step, at prescribed timing and for a prescribed period, a reverse rotation operation of reversely rotating the screw is performed or a screw halt operation of halting a normal rotation of the screw is performed.

In the injection molding method according to the present invention, the added component may be a reinforcing fiber.

Usually, at the time of the plasticizing step, only the shearing force in the rotation (normal rotation) direction of the screw is mainly applied to the fiber bundle of the reinforcing fibers inside the screw groove. However, according to the present invention, at the time of the plasticizing step, the shearing force in accordance with the normal rotation of the screw is added to the fiber bundle inside the screw groove, and the screw reversely rotates, thereby causing a flow of the molten resin M in an orientation opposite to that at the time of the normal rotation. Accordingly, the shearing force can be applied in the orientations opposite to each other. In addition, in a case where the screw halt operation is performed, the shearing force can act on the fiber bundle due to the normal rotation by that time and the change of the state of the flow of the molten resin M. Therefore, when an agitation action is applied to the fiber bundle, a mixing or kneading action applied to the fiber bundle increases, and due to shearing heat generation by the shearing force, the temperature of the molten resin rises and the viscosity is lowered. Accordingly, the molten resin enters a space between the fiber bundles, opening of the fiber bundle can be promoted, and dispersion of the reinforcing fibers inside the molten resin can be promoted. Besides, in the present invention, the screw which has normally rotated is only caused to reversely rotate. Therefore, an excessive shearing force is not applied to the reinforcing fibers. That is, the reverse rotation of the screw denotes to apply an action of disentangle the lump of fibers pressed together in one direction due to the normal rotation in a direction opposite to the pressed direction. Therefore, no excessive shearing force is applied to the fibers.

In the injection molding method according to the present invention, in the reverse rotation operation, the screw may rotate reversely as much as a prescribed rotation angle or a prescribed time.

In the injection molding method according to the present invention, in the reverse rotation operation, the prescribed rotation angle or the prescribed time may be segmented and the screw may rotate reversely in a consecutive or intermittent manner.

In the injection molding method according to the present invention, the reverse rotation operation may continue until at least a prescribed reverse rotation velocity or prescribed reverse rotation torque is attained. In this case, a time taken from a start of a reverse rotation until the prescribed reverse rotation velocity is attained, and a reverse rotation angle may be controlled to be equal to or greater than prescribed values or acceleration may be controlled to be equal to or greater than a prescribed value.

In addition, in the injection molding method according to the present invention, the reverse rotation operation of the screw may be performed by causing the reverse rotation operation to continue in a consecutive or intermittent manner until at least the prescribed reverse rotation velocity or the prescribed reverse rotation torque is attained. In addition, there are at least three choices for the reverse control of the reverse rotation after the prescribed reverse rotation velocity or the prescribed reverse rotation torque is attained. The first choice is that the reverse rotation operation ends at the same time as the attainment. The second choice is that while the prescribed reverse rotation velocity or the prescribed reverse rotation torque is maintained after the attainment, the reverse rotation operation continues. The third choice is that controlling is performed such that the reverse rotation velocity is further increased or the reverse rotation torque is further increased after the attainment.

In the injection molding method according to the present invention, the normal rotation operation of normally rotating the screw and the reverse rotation operation may be alternately performed.

In the injection molding method according to the present invention, a retreat operation of forcibly causing the screw to retreat is performed as much as prescribed strokes or the prescribed time. In this case, the retreat operation, the normal rotation operation, and the reverse rotation operation can be performed in order. In addition, in this case, after it is detected that the space which is formed in front of the screw by performing the retreat operation and in which no molten resin is present is filled with the molten resin by performing the normal rotation operation, the reverse rotation operation can be performed. In addition, in the retreat operation, the screw can forcibly retreat in a consecutive or intermittent manner by segmenting the prescribed strokes or the prescribed time.

In the injection molding method according to the present invention, in a case where the screw halt operation is performed, the normal rotation operation in which the screw normally rotates, and the screw halt operation can be alternately performed.

According to the present invention, there is provided an injection molding machine executing the injection molding method described above. The injection molding machine includes a cylinder that is provided with a discharge nozzle on the front side and includes an added component supply hole for supplying an added component, a screw that is provided inside the cylinder so as to be able to rotate normally and reversely around a rotating axis, and a control section that includes a control program for controlling an operation of the screw. Plasticizing is performed by applying a shearing force to the added component which is supplied to the cylinder, through a normal rotation of the screw, and a molten resin is generated. The control section includes the control program for reversely rotating the screw in the plasticizing and has a reverse rotation velocity input setting portion which is able to set a condition of a reverse rotation operation of the screw with an arbitrary value.

In addition, according to the present invention, there is provided an injection molding machine including a cylinder that is provided with a discharge nozzle on the front side and includes an added component supply hole for supplying an added component, a screw that is provided inside the cylinder so as to be able to rotate around a rotating axis, and a control section that controls an operation of the screw. Plasticizing is performed by applying a shearing force to the added component which is supplied to the cylinder, through a normal rotation of the screw, and a molten resin is generated. The control section is a control device which includes a control program for alternately switching the screw between the normal rotation and a rotation halt and has a rotation halt condition input setting portion which is able to set a condition of halting the screw with an arbitrary value, in the plasticizing.

Advantageous Effects of Invention

According to the present invention, it is possible to provide the injection molding method and the injection molding machine in which uneven distribution of the reinforcing fibers can be eliminated without applying an excessive shearing force to the reinforcing fibers and by using a simple single-shaft plasticizing screw, even in generation of the molten resin, in which the added components, particularly the reinforcing fibers and the resin raw material are supplied to the inside of the cylinder.

BRIEF DESCRIPTION OF DRAWINGS

FIG. 2 is a view schematically illustrating molten states of a resin in each procedure of injection molding according to the present embodiment.

FIG. 3(a) is a view illustrating a state of a start of plasticizing. FIG. 3(b) is a view illustrating a state after the screw normally rotates as much as a prescribed period. FIG. 3(c) is a view illustrating a state after the screw reversely rotates as much as a prescribed period successively following the normal rotation. FIG. 3(d) is a view illustrating a state after the screw normally rotates as much as a prescribed period successively following the reverse rotation. FIG. 3(e) is a view illustrating a state after the screw reversely rotates as much as a prescribed period successively following the normal rotation. FIG. 3(f) is a view illustrating a state where the screw advances and injection is completed.

FIG. 5(a) is a side view illustrating a flow of a molten resin occurring inside the screw groove due to a normal rotation, according to the present embodiment. FIG. 5(b) is a longitudinal sectional view illustrating a flow of the molten resin occurring inside the screw groove due to a reverse rotation. FIG. 5(c) illustrates velocity distribution of the molten resin in a case of FIG. 5(a). FIG. 5(d) is a longitudinal sectional view illustrating velocity distribution of the molten resin in a case of FIG. 5(b).

FIG. 13 illustrates a plasticizing step in the related art.

FIG. 15 is a view illustrating a screw reverse rotation velocity setting screen which is a man-machine interface of a control device of the injection molding machine used in the experiment checking the effect of the present embodiment.

DESCRIPTION OF EMBODIMENT

Hereinafter, the present invention will be described in detail based on an embodiment illustrated in the accompanying drawings.

Figure 1:
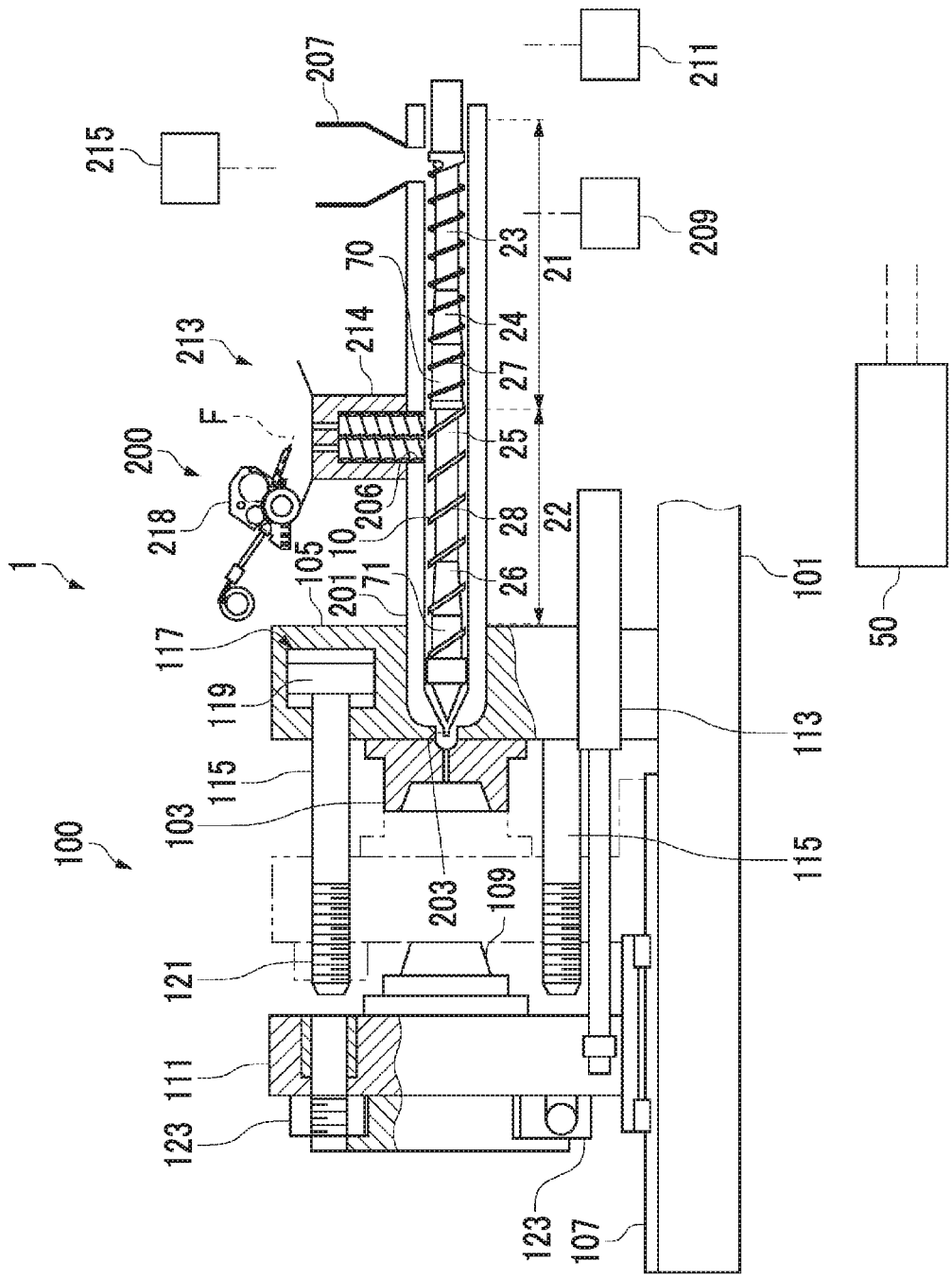
FIG. 1 is a view illustrating a schematic configuration of an injection molding machine according to the present embodiment.

As illustrated in FIG. 1, an injection molding machine 1 according to the present embodiment includes a mold clamping unit 100, a plasticizing unit 200, and a control section 50 which controls operations of the units.

Hereinafter, the outline of the configuration and the operation of the mold clamping unit 100, and the configuration and the operation of the plasticizing unit 200 will be described. Subsequently, the procedure of injection molding performed by the injection molding machine 1 will be described.

Configuration of Mold Clamping Unit

The mold clamping unit 100 includes a stationary platen 105 which is fixed to the top of a base frame 101 and to which a fixed mold 103 is attached, a movable platen 111 which moves the lateral direction of the view on a slide member 107 such as a rail and a slide plate due to an operation of a hydraulic cylinder 113 and to which a movable mold 109 is attached, and a plurality of tie bars 115 which interlock the stationary platen 105 and the movable platen 111 with each other. The stationary platen 105 is provided with a mold-clamping hydraulic cylinder 117 coaxially with each of the tie bars 115. One end of each tie bar 115 is connected to a ram 119 of the hydraulic cylinder 117.

Each of the elements performs a necessary operation in response to an instruction of the control section 50.

Operation of Mold Clamping Unit

The outline of the operation of the mold clamping unit 100 is as follows.

First, in accordance with an operation of the mold open/close hydraulic cylinder 113, the movable platen 111 moves to a position indicated with the two-dot chain line in the view, and the movable mold 109 is caused to abut on the fixed mold 103. Subsequently, a male screw portion 121 of each tie bar 115 and a halved nut 123 provided in the movable platen 111 are engaged with each other, and the movable platen 111 is fixed to the tie bars 115. The pressure of hydraulic oil of an oil chamber inside the hydraulic cylinder 117 on the movable platen 111 side is raised, and the fixed mold 103 and the movable mold 109 are tightened together. In this manner, after mold clamping is performed, a molten resin M is injected from the plasticizing unit 200 into a cavity of a mold, thereby molding a molded product.

As described below, since a screw 10 of the present embodiment adopts a method in which thermoplastic resin pellets P and reinforcing fibers F are individually supplied in the longitudinal direction of the screw, the overall length of the screw 10 or the overall length of the plasticizing unit 200 is likely to be long. Therefore, in the present embodiment, even in a narrow space where a mold clamping apparatus adopting a toggle link method or a method including a mold clamping cylinder on the back face of the movable platen cannot be installed, it is effective to combine the mold clamping unit 100 having the above-described configuration which allows the installation and space-saving in order to restrain the injection molding machine 1 to have a short overall length. However, the configuration of the mold clamping unit 100 illustrated herein is merely an example and does not prohibit a different configuration from being applied or replacing the configuration. For example, in the present embodiment, the hydraulic cylinder 113 is illustrated as a mold open/close actuator. However, the hydraulic cylinder 113 may be replaced with a combination of a mechanism converting a rotational movement into a rectilinear movement and an electric motor such as a servo motor and an induction motor. As the conversion mechanism, a ball screw or a rack-and-pinion can be adopted. In addition, it is needless to mention that the mold clamping unit may be replaced with a toggle link-type mold clamping unit which operates through electric driving or hydraulic driving.

The present embodiment adopts the reinforcing fibers F as added components.

Configuration of Plasticizing Unit

The plasticizing unit 200 includes a barrel-type heating cylinder 201, a discharge nozzle 203 which is provided at the downstream end (the front side) of the heating cylinder 201, the screw 10 provided inside the heating cylinder 201, a fiber supply device 213 to which the reinforcing fibers F are supplied, and a resin supply hopper 207 to which the resin pellets P are supplied. The fiber supply device 213 is interlocked with a vent hole 206 which is provided on the downstream side beyond the resin supply hopper 207.

The plasticizing unit 200 includes a first electric motor 209 which causes the screw 10 to advance or retreat, a second electric motor 211 which normally rotates or reversely rotates the screw 10 around a rotating axis, and a pellet supply device 215 which supplies the resin pellets P to the resin supply hopper 207. Each of the elements performs a necessary operation in response to an instruction of the control section 50.

A load cell (not illustrated) is interposed between the end portion (the back end) of the screw 10 on the downstream side and the first electric motor 209 such that a load received by the screw 10 in the axial direction can be detected. The plasticizing unit 200 operated by the electric motor controls the back pressure of the screw 10 in plasticizing based on the load detected by the load cell. In the present embodiment, for the purpose other than controlling the back pressure, the load detected by the load cell is adopted. This will be described below.

The screw 10 is designed to be a two-stage type similar to a so-called gas vent-type screw. Specifically, the screw 10 includes a first stage 21 which is provided on the upstream side and a second stage 22 which leads to the first stage 21 and is provided on the downstream side. The first stage 21 includes a feed zone 23, a compression zone 24, and a metering zone 70 in order from the upstream side. The second stage 22 includes a feed zone 25, a compression zone 26, and a metering zone 71 in order from the upstream side. In the view, the right side is the upstream side, and the left side is the downstream side.

In the screw 10, the first stage 21 is provided with a first flight 27, and the second stage 22 is provided with a second flight 28.

Figure 13A:
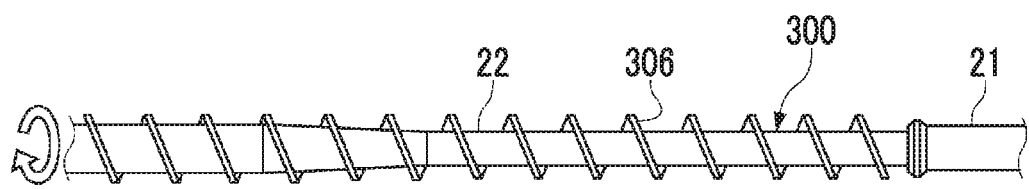
FIG. 13(a) is a side view illustrating a portion of a second stage.
Figure 13B:
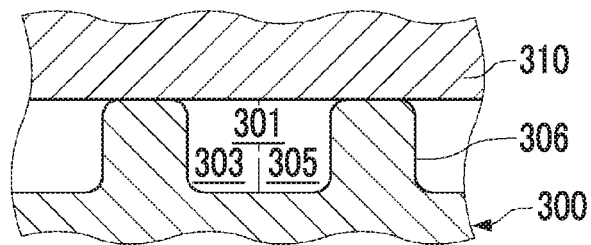
FIG. 13(b) is a cross-sectional view illustrating the screw groove formed by flights, and the vicinity thereof.
Figure 13C:
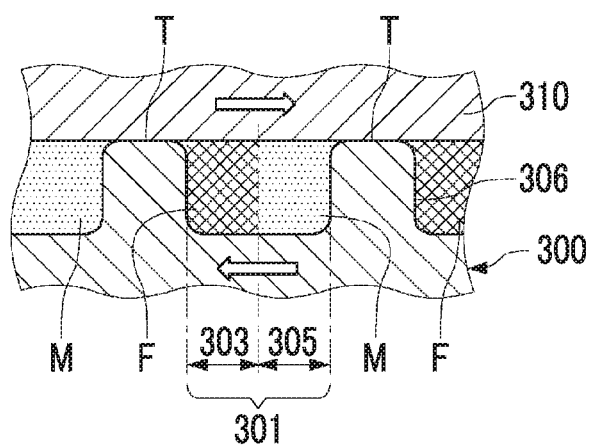
FIG. 13(c) is a cross-sectional view schematically illustrating a state where a bundle of the reinforcing fibers and a bundle of the molten resins are separately present inside the screw groove.

Relatively, both the first stage 21 and the second stage 22 are set such that screw grooves between flights in the feed zones 23 and 25 are deep and the screw grooves between the flights in the compression zones 24 and 26 gradually decrease from the upstream side toward the downstream side. The screw grooves in the metering zones 70 and 71 are set so as to be the shallowest. Here, since the screw groove of the feed zone 25 in the second stage 22 is deeper than the screw groove of the metering zone 70 in the first stage 21, the molten resin M discharged from the first stage 21 to the feed zone 25 cannot fill the screw groove of the feed zone 25. Accordingly, the molten resin M is pushed to a push-side 305 due to a rotation of the screw 10 and is unevenly distributed. Accordingly, a space is generated on a pull-side 303 of the feed zone 25 in the second stage 22. Therefore, regarding the reinforcing fibers F supplied from the fiber supply device 213 via the vent hole 206, the reinforcing fibers F are allocated on the pull-side 303 which becomes the space. Therefore, as illustrated in FIG. 13, it is understood that the molten resin M and the reinforcing fibers F are discriminated from each other.

In the first stage 21, in addition to melting a resin raw material and generating the molten resin M, the generated molten resin M is transported toward the second stage 22. Therefore, it is favorable to have a function of ensuring a transportation velocity and the plasticizing ability of the molten resin M.

In order to achieve the function, as illustrated in FIG. 1, it is preferable that a flight lead (L1) of the first flight 27 in the first stage 21 is equal to or less than a flight lead (L2) of the second flight 28 in the second stage 22, that is, L1<L2 is established. The flight lead (hereinafter, simply the lead) denotes a gap between the flights adjacent to each other in the front and the back. As a parameter, the lead L1 of the first flight 27 is preferably 0.4 to 1.0 times the lead L2, and is more preferably 0.5 to 0.9 times thereof.

According to a preferable form in which the above-described L1<L2 is established, the lead L2 of the second flight 28 in the second stage 22 is greater than the lead L1 of the first flight 27. The second stage 22 receives a supply of the reinforcing fibers F on the back end side thereof in the plasticizing step. When the lead L2 is significant, the groove width between the second flights 28 is significant. Accordingly, the space which can be filled with the falling reinforcing fibers F increases. Furthermore, when the screw 10 retreats at the time of the plasticizing step and when the screw 10 advances at the time of an injecting step, the number of times the vent hole 206 is blocked by the second flight 28 is reduced. Therefore, even while the screw 10 is retreating or advancing, the reinforcing fibers F are likely to consecutively fall into the groove without being stopped by the second flight 28. Specifically, in a region where the reinforcing fibers F supplied through the vent hole 206 of the second flight 28 are received, the lead L2 is preferably set to equal to or greater than 1.0×D and is more preferably set to equal to or greater than 1.2×D. Consequently, in the injecting step, the reinforcing fibers F can stably fall into the groove of the screw 10. The factor D indicates the inner diameter of the heating cylinder 201.

However, when the lead L2 is excessively significant, a force of transporting the molten resin M is weakened. Therefore, even by the back pressure (5 to 10 MPa) to the extent of being required in ordinary plasticizing, the transportation of the molten resin M becomes unstable, and thus, the molten resin M flows backward through the vent hole 206 due to the back pressure and vent-up is likely to occur. Therefore, the lead L2 is preferably set to equal to or less than 2.0×D and is more preferably set to equal to or less than 1.7×D. That is, the lead L2 of the second flight 28 preferably ranges from 1.0×D to 2.0×D and more preferably ranges from 1.2×D to 1.7×D.

In addition, the width of the flight of the second flight 28 preferably ranges from 0.01 to 0.3 times the lead L2 (0.01× L2 to 0.3×L2). When the width of the flight is smaller than 0.01 times the lead L2, the strength of the second flight 28 becomes insufficient. When the width of the flight exceeds 0.3 times the lead L2, the width of the screw groove becomes small. Thus, the fibers are caught by the apex portions of the flights and are unlikely to fall into the groove.

In addition, in addition to the preferable form in which the above-described L1<L2 is established, the second flights 28, particularly in the feed zone 25 in the second stage 22 may be partially or entirely a plurality of flights, instead of the single flight. In this case, since the molten resin M discharged from the first stage is distributed by being segmented into each of the screw grooves defined by the plurality of flights, a fiber bundle and the molten resin M come into contact with each other and are mixed together inside each of the screw grooves. Therefore, the fiber bundle is effectively impregnated with the molten resin M. Furthermore, when there are the plurality of flights in the region where the reinforcing fibers F are supplied from the fiber supply device 213, the number of passages of the flights below the vent hole 206 per rotation of the screw 10 increases due to the plurality of flights. Therefore, the ability of scraping the reinforcing fibers F from the vent hole 206 is improved, and the efficiency of taking the reinforcing fibers F into the groove of the screw 10 is improved.

As illustrated in FIG. 1, in the fiber supply device 213 of the present embodiment, a twin-shaft-type screw feeder 214 is provided in the heating cylinder 201, and the reinforcing fibers F are forcibly supplied to the inside of the groove of the screw 10. It is needless to mention that a single-shaft-type screw feeder may be adopted without any hindrance.

As a method of supplying the reinforcing fibers F to the twin-shaft-type screw feeder 214, continuous fibers, that is, fibers in a so-called roving state (hereinafter, will be referred to as roving fibers) may be directly inserted into the twin-shaft-type screw feeder 214, or fibers cut into prescribed lengths in advance in a chopped strand state (hereinafter, will be referred to as chopped fibers) may be inserted. Otherwise, the roving fibers and the chopped fibers may be mixed together at a prescribed ratio and may be inserted.

In a case where the chopped fibers are inserted, the fibers are transported as the roving fibers to a location near a fiber insertion port of a measuring feeder, and immediately after the roving fibers are cut near the fiber insertion port, the cut fibers may be inserted into the measuring feeder. Accordingly, the chopped fibers which are likely to scatter are not exposed until the chopped fibers are inserted into the molding machine, and thus, workability can be improved.

In the present embodiment, a roving cutter 218 is provided near the fiber insertion port of the twin-shaft-type screw feeder 214. The roving fibers are cut by the roving cutter 218, and the obtained chopped fibers are supplied to the twin-shaft-type screw feeder 214.

Operation of Plasticizing Unit

The outline of the operation of the plasticizing unit 200 is as follows. Refer to FIG. 1.

When the screw 10 provided inside the heating cylinder 201 rotates, the reinforcing fibers F supplied from the fiber supply device 213 via the vent hole 206, and pellets (resin pellets P) formed of thermoplastic resins supplied from the resin supply hopper 207 are sent out toward the discharge nozzle 203 at the downstream end of the heating cylinder 201. It is preferable that the timing to start supplying the reinforcing fibers F is after the resin pellets P (the molten resin M) supplied from the resin supply hopper 207 arrives at the vent hole 206 to which the reinforcing fibers F are supplied. When the reinforcing fibers F start to be inserted before the molten resin M arrives at the vent hole 206, there is a possibility that the reinforcing fibers F having poor fluidity and transport performance by the screw 10 block the inside of the screw groove, the transportation of the molten resin M is hindered such that the molten resin M is spilt out through the vent hole 206, and abnormal abrasion or damage is caused in the screw 10. After being mixed with the reinforcing fibers F, the molten resin M is injected as much as a prescribed amount into the cavity formed between the fixed mold 103 and the movable mold 109 of the mold clamping unit 100. It is needless to mention that the injection is accompanied by the basic operation of the screw 10 in which the screw 10 advances after the screw 10 retreats while receiving the back pressure in accordance with melting of the resin pellets P. In addition, a different configuration, for example, a heater for melting the resin pellets P is provided outside the heating cylinder 201 is not prohibited from being applied or replacing the configuration.

Procedure of Injection Molding

The injection molding machine 1 having the above-described elements performs injection molding through the following procedure.

As is widely known, the injection molding includes a mold clamping step of closing the movable mold 109 and the fixed mold 103 and performing mold clamping at high pressure, the plasticizing step of heating, melting, and plasticizing the resin pellets P inside the heating cylinder 201, the injecting step of injecting and the plasticized molten resin M into the cavity formed by the movable mold 109 and the fixed mold 103 and filling the cavity, a holding step of cooling the molten resin M filling the cavity until the molten resin M is solidified, a mold opening step of opening the mold, and a taking out step of taking out the molded product which is cooled and solidified inside the cavity. One cycle of injection molding is completed by sequentially performing each of the above-described steps or concurrently executing the portions thereof.

Figure 2A:
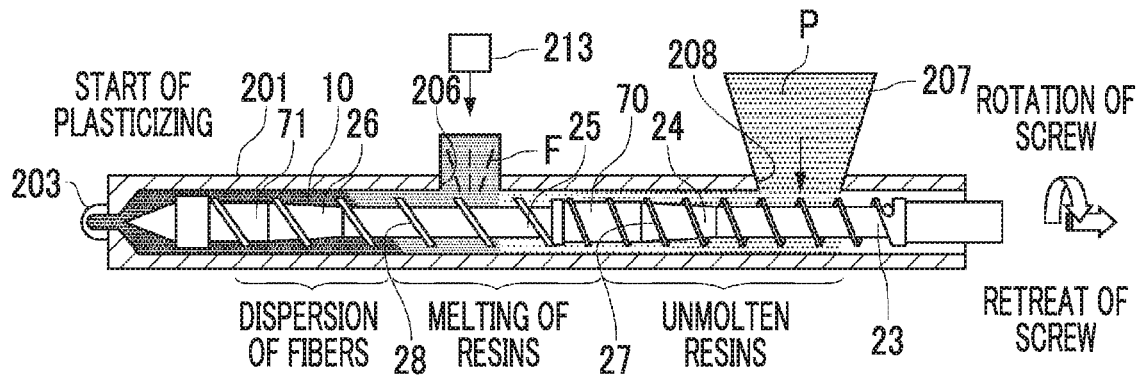
FIG. 2(a) illustrates a state when plasticizing starts.
Figure 2B:
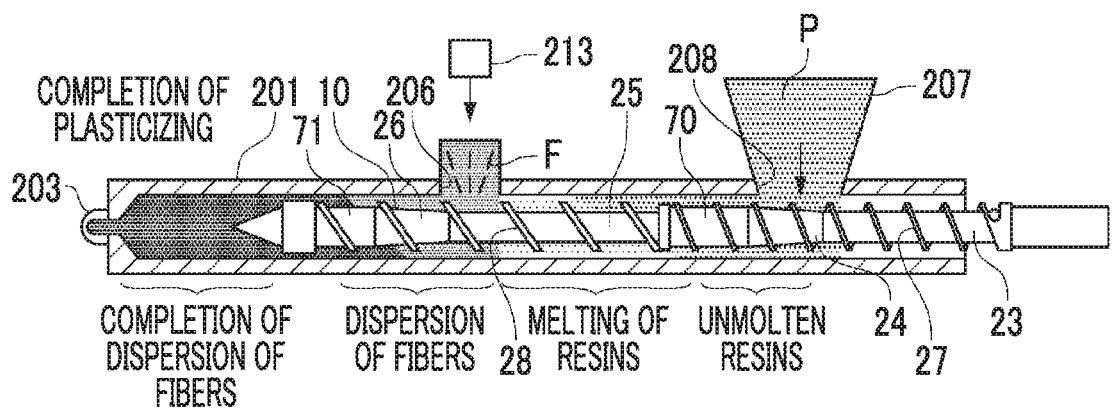
FIG. 2(b) illustrates a state when plasticizing is completed.

Successively, the outline of the plasticizing step and the injecting step related to the present embodiment will be described in order with reference to FIG. 2. In the present embodiment, the screw 10 reversely rotates in the plasticizing step, and the operation thereof will be described with reference to FIG. 3 after the injecting step is described.

Plasticizing Step

In the plasticizing step, the resin pellets P are supplied through a supply hole 208 corresponding to the resin supply hopper 207 of the heating cylinder 201 on the upstream side. The screw 10 at the time of the start of plasticizing is positioned on the downstream side of the heating cylinder 201, and the screw 10 retreats from the initial position while rotating (FIG. 2(a), "start of plasticizing"). When the screw 10 rotates, the resin pellets P supplied to a space between the screw 10 and the heating cylinder 201 are heated by receiving a shearing force and are gradually molten, thereby transported toward the downstream side. In the present invention, the rotation (the orientation) of the screw 10 in the plasticizing step is referred to as the normal rotation. When the molten resin M is transported to the fiber supply device 213, the reinforcing fibers F are supplied from the fiber supply device 213. In accordance with the rotation of the screw 10, the reinforcing fibers F are kneaded with the molten resin M and are dispersed, thereby being transported to the downstream together with the molten resin M. When the resin pellets P and the reinforcing fibers F continue to be supplied and the screw 10 continuously rotates, the molten resin M is transported to the downstream side of the heating cylinder 201 together with the reinforcing fibers F, and the molten resin M is accumulated on the downstream side beyond the screw 10. The screw 10 retreats due to the balance between the resin pressure of the molten resin M accumulated on the downstream side of the screw 10 and the back pressure restraining the screw 10 from retreating. Thereafter, when the amount of the molten resin M necessary for one shot is measured and accumulated, the rotation and the retreat of the screw 10 are halted (FIG. 2(b), "completion of plasticizing").

FIG. 2 illustrates states of resins (the resin pellets P, the molten resin M) and the reinforcing fibers F divided into four stages such as "unmolten resins", "melting of resins", "dispersion of fibers", and "completion of fiber dispersion". In the stage of "completion of plasticizing", "completion of fiber dispersion" on the downstream side beyond the screw 10 indicates a state where the reinforcing fibers F are dispersed in the molten resin M and are injected, and "dispersion of fibers" indicates that the supplied reinforcing fibers F are dispersed in the molten resin M in accordance with the rotation of the screw 10. In addition, "melting of resins" indicates that the resin pellets P are gradually molten by receiving the shearing force, and "unmolten resins" indicates a state where even though the shearing force is received, an insufficiently molten resin remains and the entirety of the resin is not molten. However, in the region of "completion of fiber dispersion", there are cases where the reinforcing fibers F are unevenly distributed.

Injecting Step

Figure 2C:
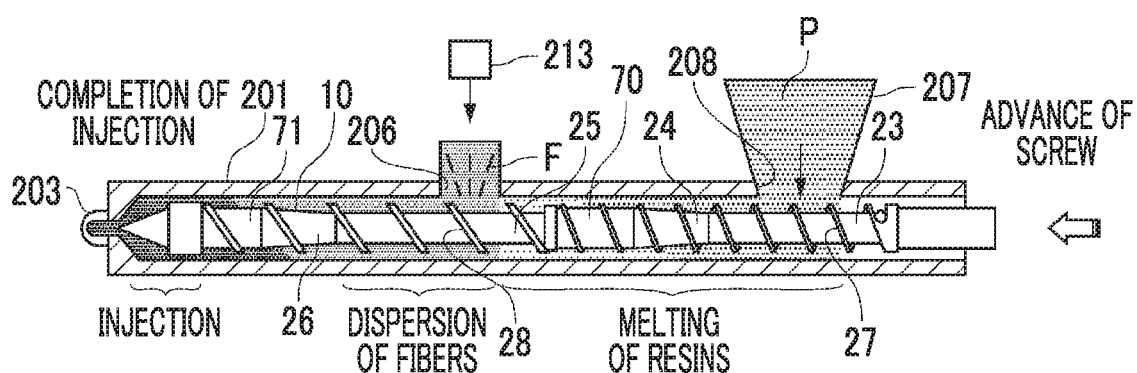
FIG. 2(c) illustrates a state when injection is completed.

In the injecting step, as illustrated in FIG. 2(c), the screw 10 advances. Consequently, a backflow prevention valve (not illustrated) provided at the tip portion of the screw 10 is closed. Thus, the pressure (the resin pressure) of the molten resin M accumulated on the downstream side of the screw 10 rises, and the molten resin M is discharged from the discharge nozzle 203 into the cavity.

Then, after passing through the holding step, the mold opening step, and the taking out step, one cycle of injection molding is completed, and the mold clamping step and the plasticizing step for the next cycle are performed.

Reverse Rotation Operation of Screw 10

According to the present embodiment, in the plasticizing step, the screw 10 reversely rotates.

Figure 3:
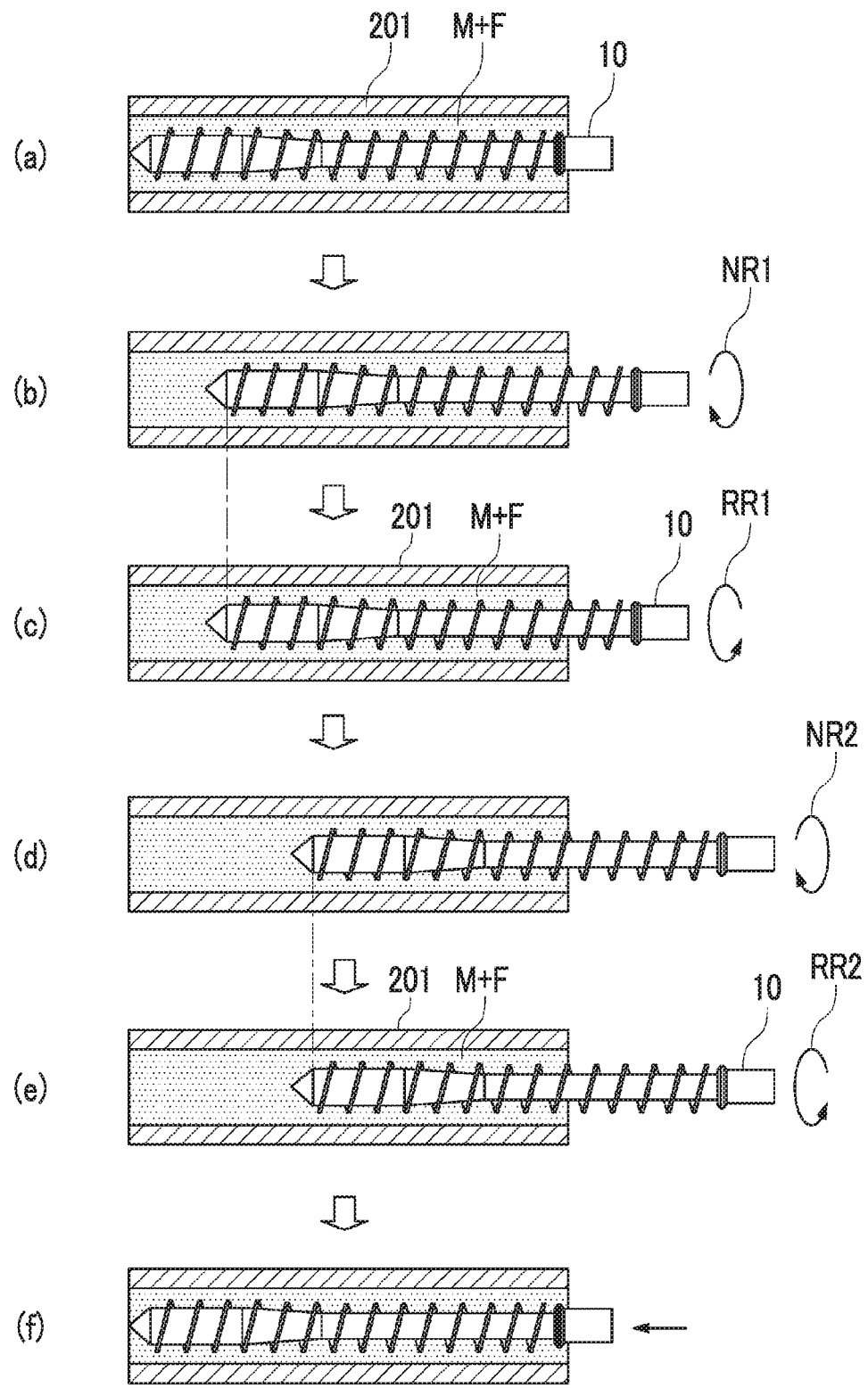
FIG. 3 is a view illustrating an operation of a screw after plasticizing starts, according to the present embodiment.

Usually, in the plasticizing step, the screw 10 normally rotates only, and the screw 10 retreats while receiving the back pressure, due to the resin pressure of the molten resin M transported to the downstream side in accordance with the normal rotation. In the present embodiment, in addition to the normal rotation, the screw 10 reversely rotates. Hereinafter, detailed description will be given with reference to FIG. 3. In FIG. 3, only the elements necessary to describe the normal rotation and the reverse rotation are depicted.

Essential Reverse Rotation Operation

When the plasticizing step starts, the screw 10 normally rotates (first normal rotation, NR1), and the downstream side of the screw 10 is filled with the molten resin M. This process is illustrated in FIGS. 3(a) and 3(b). The screw 10 retreats to a prescribed position.

After the first normal rotation is performed as much as a prescribed period, as illustrated in FIG. 3(c), the screw 10 reversely rotates (first reverse rotation, RR1). Accordingly, the molten resin M receives a transport force toward the upstream side different from that in the normal rotation.

After the first reverse rotation is performed as much as a prescribed period, the screw 10 normally rotates (second normal rotation, NR2), and as illustrated in FIG. 3(d), the screw 10 retreats to a prescribed position.

Next, after the second normal rotation is performed as much as the prescribed period, as illustrated in FIG. 3(e), the screw 10 reversely rotates (second reverse rotation, RR2). In this case as well, the molten resin M receives a transport force toward the upstream side different from that in the normal rotation. In this case, the prescribed period for performing the first normal rotation and the second normal rotation may be a prescribed time, for example, a period from the time elapsed after the screw 10 starts the normal rotation reaches a preset time or may be prescribed strokes, for example, a period from when the screw 10 normally rotates and retreats due to the pressure of the molten resin M until the screw 10 arrives at the prescribed position or reaches a prescribed retreat amount. In addition, in this case, the prescribed period for performing the first reverse rotation and the second reverse rotation may be a prescribed time, for example, a period from the time elapsed after the screw 10 starts the reverse rotation reaches a preset time or may be a prescribed rotation angle, for example, a period from when the screw 10 starts the reverse rotation until the screw 10 attains a prescribed number of rounds or a prescribed rotation angle. In addition, in a case or the like where the range of a sufficient rotation velocity necessary to open the reinforcing fibers F is grasped in advance through an experiment or a numerical value analysis, based on prescribed rotation acceleration, the screw 10 may be accelerated and reversely rotate until the screw 10 reaches a velocity equal to or greater than the sufficient rotation velocity necessary to open the reinforcing fibers F. Otherwise, in a case where reverse rotation torque necessary to realize the sufficient reverse rotation velocity necessary to open the reinforcing fibers F is grasped in advance, the reverse rotation operation may be performed until the screw 10 reaches torque equal to or greater than the reverse rotation torque.

Subsequently, the screw 10 advances and the injecting step is performed. In the meantime, the screw 10 rotates normally and does not reversely rotate.

The plasticizing step accompanied by the reverse rotation of the screw 10 is performed through the above-described procedure. Next, the action and the effect caused by the reverse rotation will be described with reference to FIGS. 4 and 5.

Figure 4A:
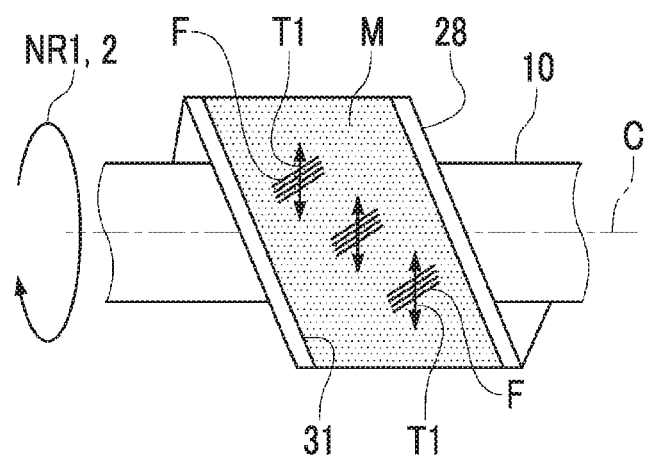
FIG. 4 is a planar view illustrating a shearing force added to a reinforcing fiber inside a screw groove, according to the present embodiment.
Figure 4B:
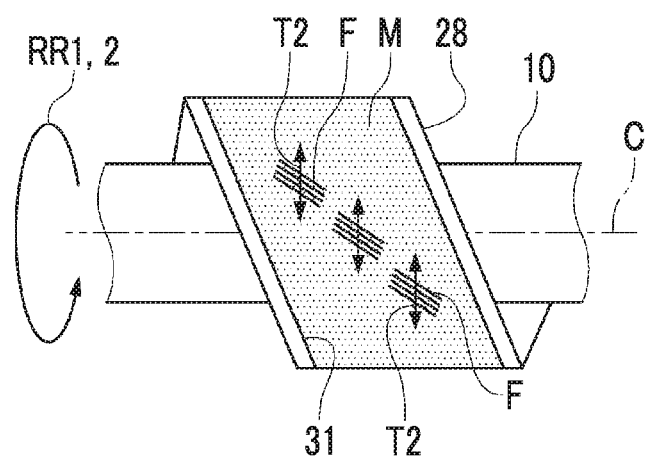

While the screw 10 performs the normal rotations NR1, 2, as illustrated in FIG. 4(*a*), the molten resin M in a screw groove 31 receives a shearing force T1 in the circumferential direction of the screw 10. Meanwhile, while the screw 10 performs the reverse rotations RR1, 2 as well, as illustrated in FIG. 4(*b*), the molten resin M in the screw groove 31 receives a shearing force T2 along the circumferential direction of the screw 10. As described below, the shearing force T2 is oriented opposite to the shearing force T1 at the time of the normal rotation.

As described above, when the normal rotation and the reverse rotation are performed, the shearing force T1 and the shearing force T2 having the orientations different from each other are added to the reinforcing fibers F. Accordingly, without being biased in one direction, the fiber bundle is disentangled due to the shearing forces in each of the directions, and every time thereof, the fiber bundle receives the shearing forces varying in phases, in directions different from each other. Therefore, compared to a case where the normal rotation and the reverse rotation are simply and independently performed, an agitation force acts on the fiber bundle and opening thereof is promoted. In addition, as illustrated in FIG. 13, in a case where the fiber bundle which is an aggregation of multiple reinforcing fibers F in the vicinity of the feed zone of the reinforcing fibers F is present on the pull-side 303 of the flight, and the molten resin M is present on the push-side 305 of the flight separately from each other, a reinforcing fiber bundle relatively moves from the pull-side 303 of the flight toward the push-side 305 of the flight due to the reverse rotation. Therefore, the molten resin M present on the push-side 305 of the flight is pushed out by the reinforcing fiber bundle, flows into a space between the pull-side 303 of the flight and the fiber bundle of the reinforcing fibers F, and enters the inside of the bundle of the reinforcing fibers F. Thus, opening of the fiber bundle can be promoted.

In addition, a rotational flow RF of the molten resin M caused inside the screw groove 31 along the inner circumference of the heating cylinder 201 of the screw 10 due to the reverse rotation operation of the screw 10 is generated throughout the overall length of the screw 10. Thus, usually, not only in the reinforcing fibers F which receive a shearing force for a long time and arrive at the tip portion of the screw 10, but also in the reinforcing fibers F inside the screw groove 31 from the tip portion of the screw 10 to the vent hole 206 for supplying the reinforcing fibers F, dispersibility is improved. Accordingly, the reinforcing fibers F inside the screw groove 31 are sufficiently dispersed and are in a cotton-like state of filling the inside of the screw groove 31. Therefore, in a case where high back pressure is applied at the time of plasticizing or when rotations of the screw is halted such as the time of a shutdown when the molding operation is suspended or ends, the pressure inside the screw groove 31 is lowered and the molten resin M inside the screw groove 31 swells. In this case, even if the molten resin M intends to flow backward through the vent hole 206, the flow resistance when the molten resin M passes through the small gaps of the cotton-like fibers of the reinforcing fibers F and flows backward becomes significant, and thus, the backflow amount is reduced. Therefore, vent-up can be restrained, and the troubles of poor supply of the reinforcing fibers F and the troubles of malfunction of the twin-shaft-type screw feeder 214 caused by the molten resin M which infiltrates into the twin-shaft-type screw feeder 214 and is solidified therein due to the vent-up can be prevented.

Here, as illustrated in FIG. 5(*a*), when the screw 10 normally rotates (NR1, NR2), a velocity V1 is caused in the molten resin M which adheres to a bottom face 31A of the screw groove 31. Accordingly, a relative velocity −V1 is caused in the molten resin M which adheres to an inner wall face 201A of the heating cylinder 201. Due to the relative difference between the velocities, as illustrated in FIG. 5(*c*), the shearing force T1 along the circumferential direction of the screw 10 is generated in the molten resin M.

Meanwhile, as illustrated in FIG. 5(*b*), when the screw 10 reversely rotates (RR1, RR2), velocities V2 and −V2 in the orientation opposite to that of the normal rotation are caused. Due to the relative difference between the velocities, as illustrated in FIG. 5(*d*), the shearing force T2 in the orientation opposite to that of the shearing force T1 is generated in the molten resin M.

In addition, in the present embodiment, since the screw 10 performs the first normal rotation, the first reverse rotation, the second normal rotation, and the second reverse rotation in order, the reinforcing fibers F alternately receives the shearing force T1 and the shearing force T2 in the orientations opposite to each other. Thus, opening of the fibers can be further promoted.

Intermittent Reverse Rotation Operation

Figure 9:
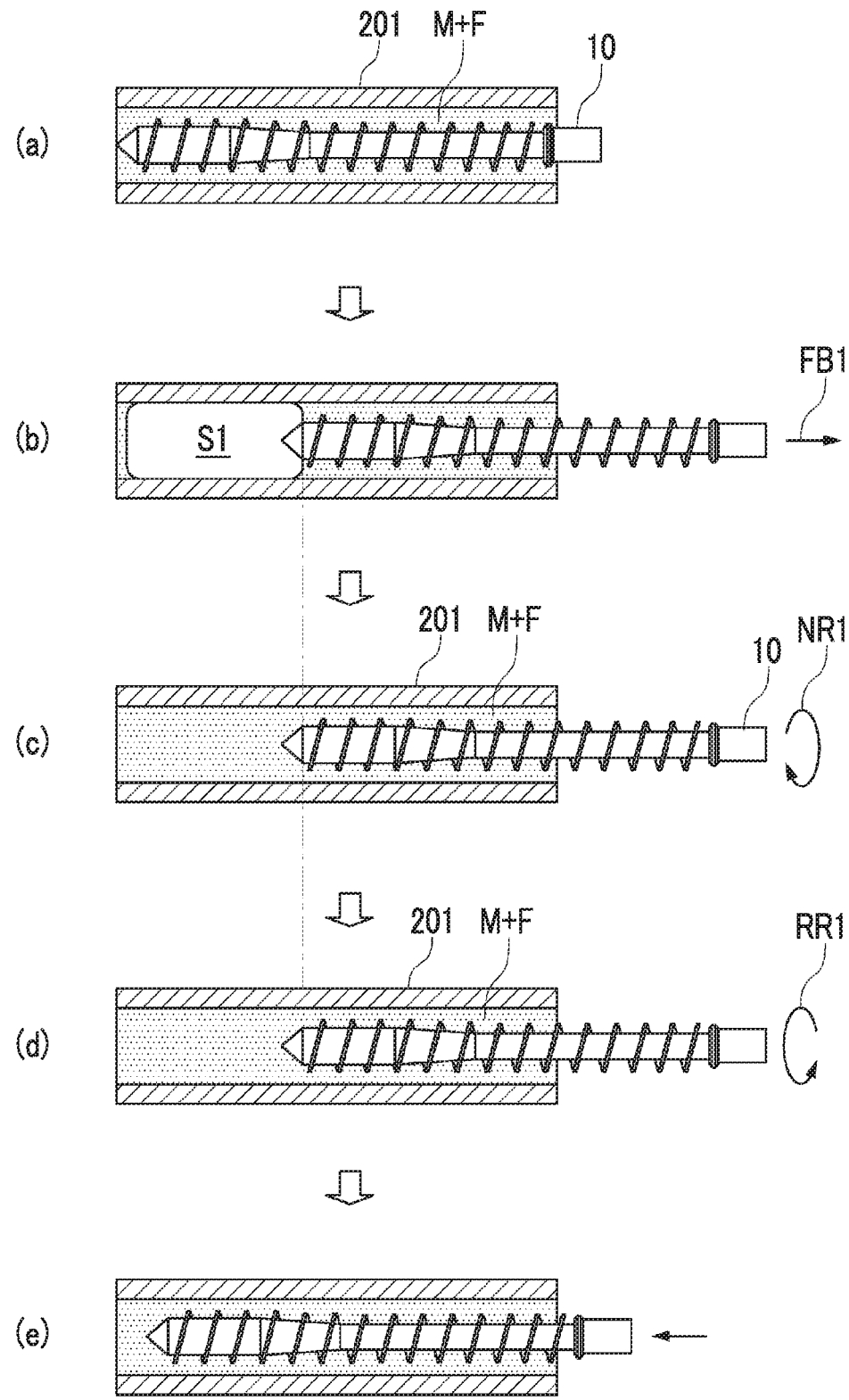
FIG. 9 is a view illustrating an example in which the screw consecutively and correctively retreats as much as prescribed strokes.
Figure 12:
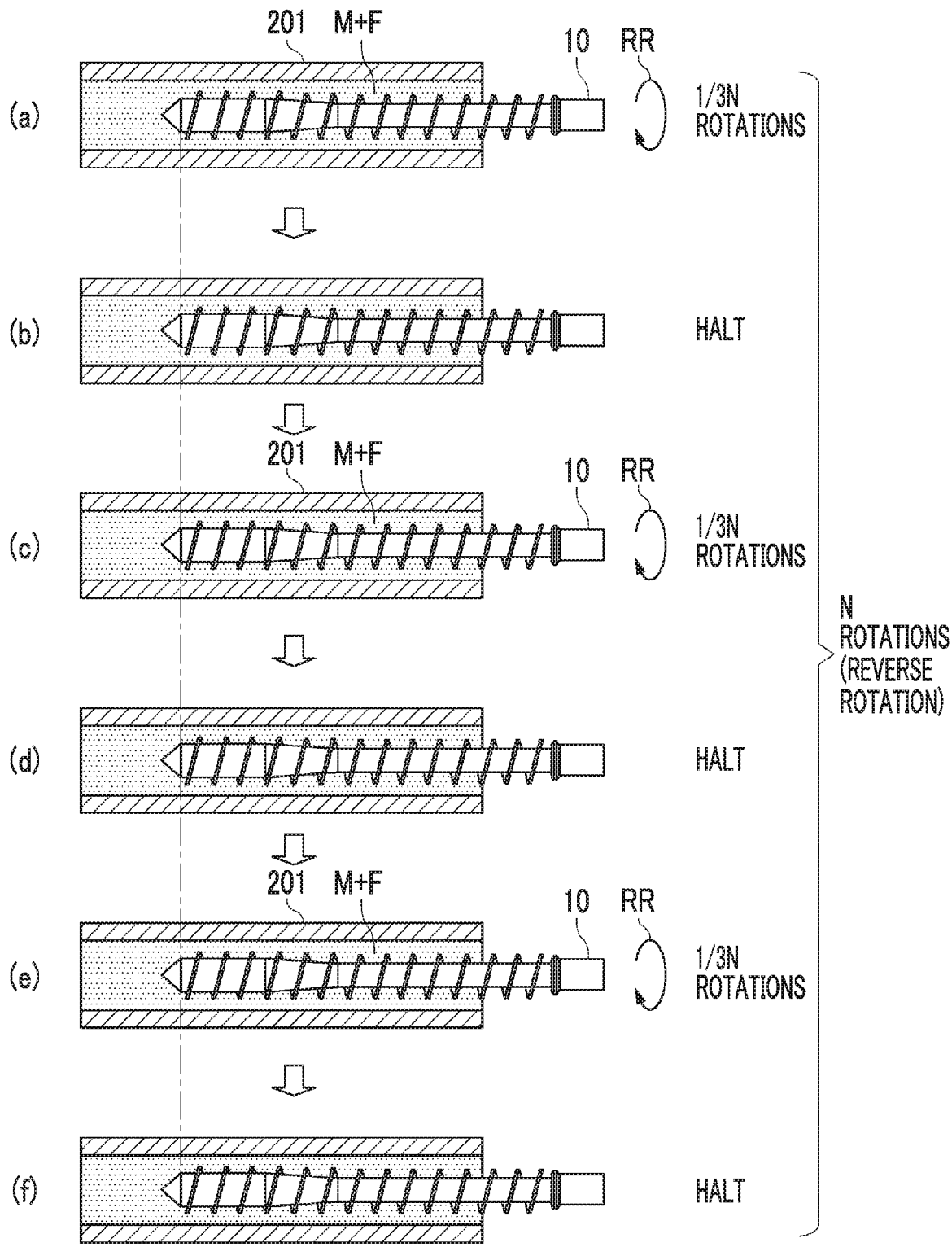
FIG. 12 is a view illustrating an example in which the reverse rotation operation is intermittently performed.

In addition, as illustrated in FIG. 12, for example, when the reverse rotation of the screw 10 is performed as much as N rotations, the screw 10 can intermittently and reversely rotate by segmenting a prescribed reverse rotation angle, for example, in a manner in which the screw 10 reversely rotates as much as ⅓N rotations (FIG. 12(*a*)), is halted (FIG. 12(*b*)), reversely rotates as much as ⅓N rotations (FIG. 12(*c*)), is halted (FIG. 12(*d*)), reversely rotates as much as ⅓N rotations (FIG. 12(*e*)), and is halted (FIG. 12(*f*)). The intermittent reverse rotation can also be applied to each of the reverse rotations in a pattern in which a plurality times of reverse rotations are performed as illustrated in FIGS. 3(*a*) to 3(*d*) and 6(*a*) to 6(*g*) and can also be applied to a pattern in which the reverse rotation is performed once as illustrated in FIGS. 9(*a*) to 9(*d*). In addition, the segmented angles of the prescribed reverse rotation angle in the intermittent reverse rotation may be uniform angles or angles which are partially or entirely different from each other. In addition, the reverse rotation velocities in the intermittent reverse rotation may be uniform velocities or velocities which are partially or entirely different from each other (multi-stage velocity). Moreover, here, an example in which the reverse rotation and the halt are alternately repeated is illustrated. However, the state of the flow of the molten resin M can be changed through the normal rotation by alternately repeating the normal rotation and the halt. Naturally, in the present invention, the normal rotation operation, the reverse rotation operation, and the halt operation can be performed in arbitrary combinations.

Figure 11:
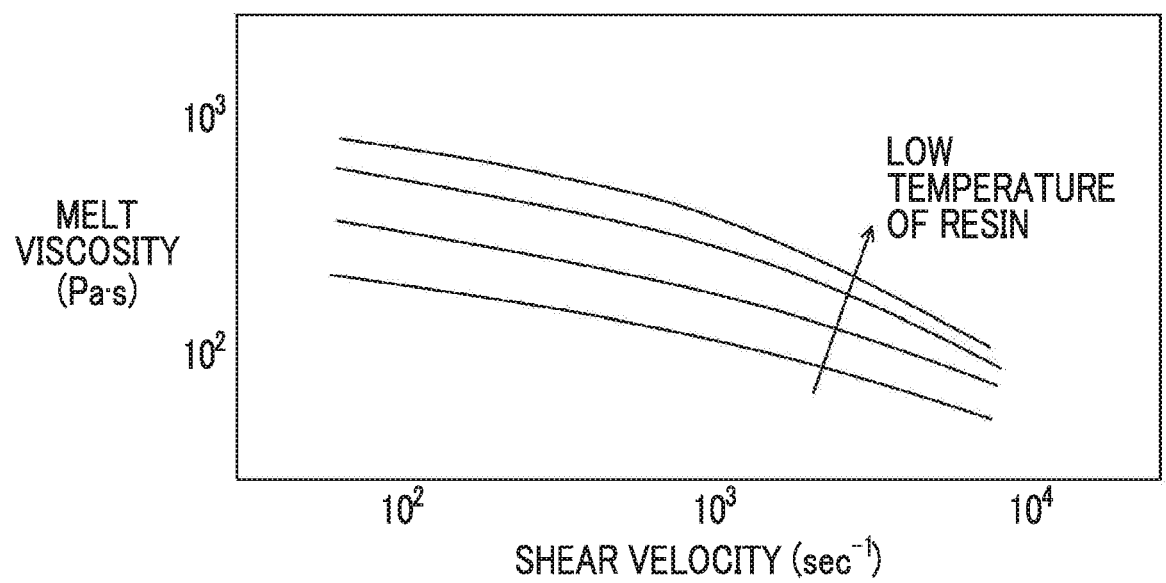
FIG. 11 is a graph illustrating a relationship between a shear velocity and melt viscosity of the molten resin.

According to the intermittent reverse rotation, it is possible to expect that opening of the reinforcing fibers F is further promoted. That is, FIG. 11 illustrates a relationship between the shear velocity and the melt viscosity of a molten resin. As the shear velocity is lower, the viscosity becomes higher. When a case where a flow is caused in the molten resin M inside the screw groove 31 is postulated, at a moment when a force is applied in order to cause the direction of the flow of a molten resin to be the opposite direction when the screw 10 is shifted from the normal rotation to the reverse rotation, that is, at a moment when a force of changing the state of the flow including the halt of the flow is applied, the molten resin behaves nearly like a solid. That is, according to the behavior at this moment, the shearing force applied to the surface of the molten resin is transmitted to the reinforcing fibers F inside the molten resin without being consumed for deformation of the molten resin. Thus, the fiber bundle of the reinforcing fibers F can be disentangled. Moreover, by continuously applying the shearing force to the molten resin, a high shearing force is added to the fiber bundle due to the high viscosity state in the low shear velocity range in the middle of acceleration, and by developing the flow of the molten resin, an agitation effect can be added to the disentangled fiber bundle. Thus, opening of the fiber bundle can be promoted.

In addition, the shearing force generated in the molten resin is the product of the melt viscosity value and the shear velocity value. However, as illustrated in FIG. 11, when the shear velocity is significant, the viscosity is low, and when the viscosity is high, the shear velocity is small. Thus, in order to acquire a significant shearing force, a condition in which the viscosity and the shear velocity are well balanced and have significant values is necessary. However, the melt viscosity is greatly influenced not only by the shear velocity but also by the type of the raw material resin and the temperature of the resin. Therefore, grasping the condition in which the viscosity and the velocity are well balanced and become significant requires the knowledge of the physical properties of the resin, is complicated, and is not easy. However, by performing the intermittent rotation halt and the reverse rotation or the normal rotation successively performed thereafter, the velocity is consecutively changed from a low velocity to a high velocity in the middle of acceleration of the reverse rotation or the normal rotation. Therefore, when a field of a shearing force caused due to a combination of the viscosity and the shear velocity is consecutively and widely applied to the molten resin, it is possible to achieve the condition in which a high shearing force can be acquired. Accordingly, without the knowledge of the physical properties of the resin, it is possible to execute a forcible retreat condition in which a significant shearing force effective for opening the reinforcing fibers F can be applied.

Therefore, when the number of times of the moving out is increased, the shearing force and the agitation force effective for the fiber bundle inside the screw groove 31 can be repetitively added. Accordingly, the degree of opening the fiber bundle can be increased.

In addition, particularly, the rotation velocity of the screw 10 when performing the intermittent reverse rotation is not limited to being uniform. The velocity can be changed. For example, in a case of the above-described example, the velocity of the reverse rotation in the first half can be raised, and the velocity thereof in the latter half can be lowered. The velocities can be set in the opposite manner. At the moment when the velocity is drastically changed from a high velocity to a low velocity or from a low velocity to a high velocity, similar to a case where a shearing force is applied in order to cause the direction of the above-described flow to be the opposite direction, the molten resin behaves similarly to a solid. Therefore, when the velocity in the reverse rotation is changed, it is possible to add the shearing force and the agitation force effective for the fiber bundle inside the screw groove 31.

In addition, in a case where the screw 10 intermittently and reversely rotates, the velocity of each reverse rotation can be changed, for example, in a manner of a high velocity, a low velocity, a high velocity, a low velocity, and so on.

In addition, in a case where the screw 10 intermittently and reversely rotates, the reverse rotation can also be performed in a consecutive or intermittent manner until the screw 10 reaches a velocity equal to or greater than the sufficient rotation velocity or torque equal to or greater than the rotation torque necessary to open the above-described reinforcing fibers F.

As described above, according to the present embodiment in which the normal rotation and the reverse rotation of the screw 10 are performed in the plasticizing step, uneven distribution of the reinforcing fibers F is eliminated, and thus, it is possible to acquire a fiber reinforcing resin having high dispersibility of the reinforcing fibers F.

Reverse Rotation Operation Combined with Forcible Retreat of Screw 10

According to the present embodiment, the screw 10 can forcibly retreat in the plasticizing step.

Usually, in the plasticizing step, the screw 10 normally rotates only, and the screw 10 retreats while receiving the back pressure, due to the resin pressure of the molten resin M transported to the downstream side in accordance with the normal rotation. In the present embodiment, without depending on the resin pressure, the screw 10 forcibly retreats through an operation of the first electric motor 209. In the forcible retreat, compared to the retreat due to the resin pressure, the velocity of the retreat is high. For example, the velocity is set to be equal to or greater than twice the velocity of the retreat due to the resin pressure. Hereinafter, with reference to FIG. 6, the operation of the screw 10 of the present embodiment accompanied by the forcible retreat will be described.

When the plasticizing step starts and the downstream side of the screw 10 is filled with the molten resin M, the screw 10 forcibly retreats as much as a distance (stroke) D1 (first retreat, FB1). This process is illustrated in FIGS. 6(a) and 6(b). As a result of the first retreat, on the downstream side beyond the tip of the screw 10, a space S1 in which no molten resin M is present is formed. The position of the screw 10 in this case will be referred to as a first retreat position.

Here, the screw 10 is considered to consecutively retreat as much as the stroke D1 without being halted in the middle of the process. In addition, during the forcible retreat, the rotation of the screw 10 is considered to be stopped. However, while the forcible retreat is performed, the screw 10 can normally rotate. In addition, the forcible retreat of the screw 10 may be performed not only until the screw 10 retreats as much as the stroke D1 but also until a counter such as a timer starting from prescribed timing counts up the time, or the forcible retreat may be performed by combining the stroke D1 and the count-up of the counter.

In addition, the space S1 is formed by swelling due to a leaked gas component mainly consisting of volatile components contained in the molten resin M, and the pressure lower than the inside of the molten resin M. When the next first normal rotation is performed, the pressure of the molten resin M rises due to the screw, and the gas component occupying the space S1 is thrust into the molten resin M again.

Figure 6:
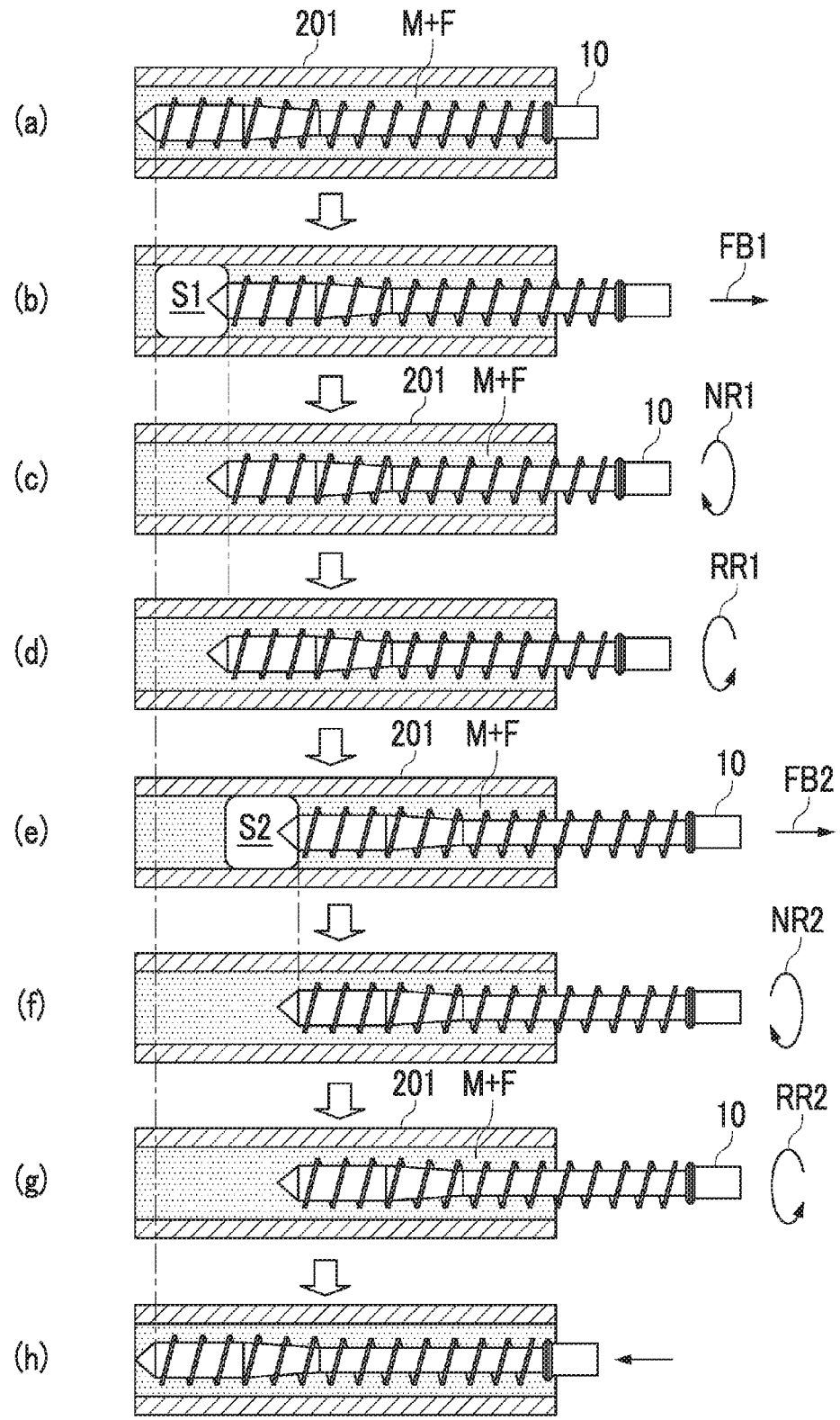
FIG. 6 is a view illustrating an operation of the screw, in which a forcible retreat is added in a plasticizing step.

Next, the screw 10 normally rotates (first normal rotation, NR1) at the first retreat position, and the molten resin M is transported toward the downstream side. As illustrated in FIG. 6(*c*), the preformed space S1 is supplemented with molten resin M.

When the space S1 is filled with the molten resin M, the screw 10 reversely rotates (first reverse rotation, RR1) as much as a prescribed period.

Whether or not the space S1 is filled with the molten resin M can be detected by the above-described load cell. That is, when the space S1 is filled from the state where the space S1 is present, the screw 10 receives a load from the molten resin M. Therefore, when the load is detected via the screw 10, it is possible to detect that the space S1 is filled with the molten resin M. With this detection as a momentum, the screw 10 reversely rotates.

Detecting that the space S1 is filled with the molten resin M is not limited to the load cell. Other types of means can be applied. When the space S1 is filled with the molten resin M, the screw 10 sometimes retreats as much as a minute amount. Accordingly, the filling state can be detected by detecting the displacement. In addition, it is possible to detect the filling state by providing a pressure gauge which penetrates the heating cylinder 201 and communicates with the inside of the heating cylinder 201.

When the screw 10 reversely rotates as much as a prescribed period, similar to the first retreat, the screw 10 forcibly retreats (second retreat, FB2) as much as the stroke D1. This process is illustrated in FIGS. 6(*d*) and 6(*e*). As a result of the forcible retreat, on the downstream side beyond the tip of the screw 10, a space S2 in which no molten resin M is present is formed. The position of the screw 10 in this case will be referred to as a second retreat position. The second retreat position coincides with a position (measurement position) of the screw 10, in which the amount of the molten resin M necessary for one shot is measured. That is, in the present embodiment, the forcible retreat is performed twice at equal strokes, and the screw 10 retreats to the measurement position. In addition, the strokes of the forcible retreat of the screw 10 may be the same strokes as each other in the first retreat and the second retreat, or may be strokes different from each other. Moreover, the velocities of the forcible retreat of the screw 10 may be the same velocities as each other in the first retreat and the second retreat, or may be velocities different from each other.

In addition, in the first retreat, it is possible to detect that the space S1 is filled with the molten resin M due to the rotation of the screw 10 at the first retreat position, through the below-described detection technique. The screw 10 continues to rotate without being halted, and based on the pressure of the molten resin M or at a prescribed velocity, after the screw 10 retreats by prescribed strokes or a prescribed time, or by arbitrarily combining the prescribed strokes and the prescribed time together, the screw 10 may forcibly retreat to the second retreat position.

In addition, in a case or the like where the range of a sufficient retreat velocity necessary to open the reinforcing fibers F is grasped in advance through an experiment or a numerical value analysis, based on prescribed retreat acceleration, the screw 10 may be accelerated and performs a retreat operation until the screw 10 reaches a velocity equal to or greater than the sufficient retreat velocity necessary to open the reinforcing fibers F. Otherwise, in a case where a forcible retreat force necessary to realize the sufficient retreat velocity necessary to open the reinforcing fibers F is grasped in advance, the retreat operation may be performed until the screw 10 reaches a force equal to or greater than the forcible retreat force.

Next, the screw 10 normally rotates (second normal rotation, NR2) at the second retreat position, and the molten resin M is transported toward the downstream side. As illustrated in FIG. 6(*f*), the preformed space S2 is supplemented with molten resin M.

When the space S2 is filled with the molten resin M, as illustrated in FIG. 6(*g*), the screw 10 reversely rotates (second reverse rotation, RR2).

When the second reverse rotation is performed as much as a prescribed period, as illustrated in FIG. 6(*h*), the screw 10 advances, thereby performing the injecting step.

Figure 7A:
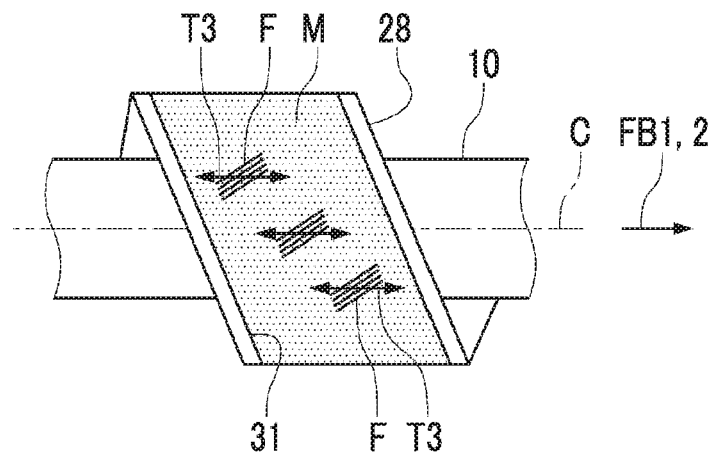
FIG. 7 is a view illustrating a shearing force added to the inside of the screw groove in a forcible retreat.
Figure 7B:
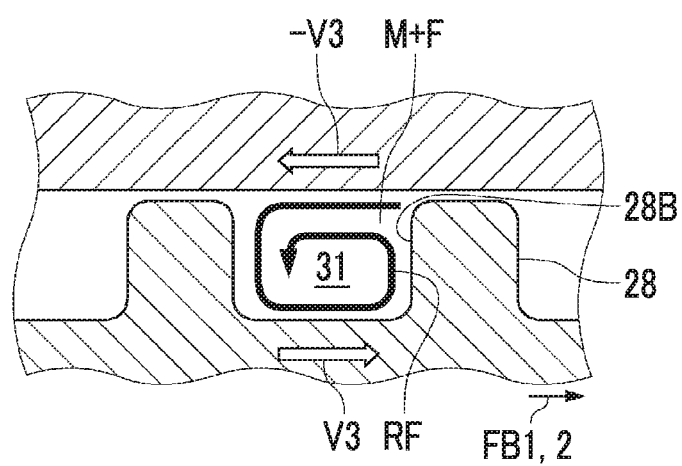
Figure 7C:
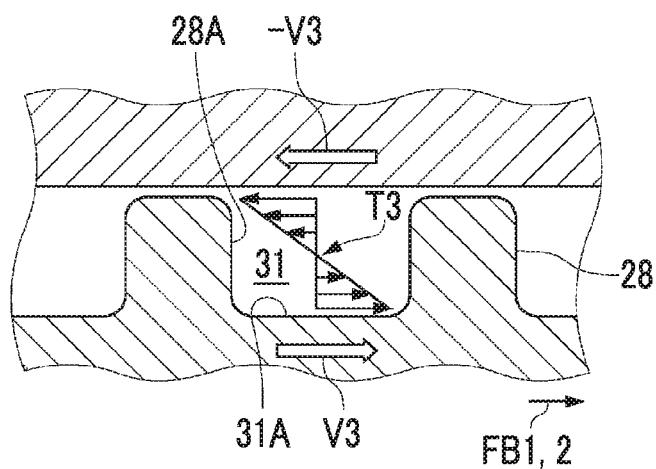

Here, while the screw 10 performs the forcible retreats FB1, FB2, as illustrated in FIG. 7(*a*), the molten resin M in the screw groove 31 receives a shearing force T3 along a rotating axis C of the screw 10. The shearing force T3 also functions as a force of opening the bundle of the reinforcing fibers F.

In addition, as illustrated in FIG. 7(*b*), when the screw 10 forcibly retreats (FB1, FB2), a velocity V3 is caused in the molten resin M which adheres to the bottom face 31A of the screw groove 31. Accordingly, a relative velocity −V3 is caused in the molten resin M which adheres to the inner wall face 201A of the heating cylinder 201. Due to the relative difference between the velocities, as illustrated in FIG. 7(*c*), the shearing force T3 along the direction of the rotating axis C of the screw 10, that is, the groove width direction of the screw groove 31 is generated in the molten resin M. In this case, the molten resin M which adheres to the inner wall face 201A of the heating cylinder 201 is scraped by the apex portion of the second flight 28 on the pull-side (the left side in the view), and the molten resin M flows into the screw groove 31 along a side face 28A of the second flight 28 on the pull-side. Moreover, the molten resin M flows into the screw groove 31 along the bottom face 31A of the screw groove 31, a side face 28B of the second flight 28 on the push-side, and the inner wall face 201A. Inside the screw groove 31, the rotational flow RF of the molten resin M along the rotating axis C is formed. Accordingly, as in FIG. 7(*c*), flows having velocities different from each other in size and direction are generated in the groove depth direction inside the screw groove 31 (similarly, flows having velocities different from each other in size and direction are also generated in the groove width direction due to the rotational flow RF. However, for the simplification of the description, description thereof will not be given herein). The shearing force is generated due to the difference between the velocities in the groove depth direction. However, since the velocity difference is distributed over the entire region in the groove width direction, the shearing force can be applied to the reinforcing fibers F across the entire region of the screw groove 31 in the groove direction, and the velocity difference functions as a force of opening the bundle of the reinforcing fibers F particularly in which the length directions of the reinforcing fibers F are arranged along the circumferential direction, or the bundle of the reinforcing fibers F in which an angle formed with respect to the circumferential direction is small. In addition, as illustrated in FIG. 13, in a case where the fiber bundle which is an aggregation of multiple reinforcing fibers F in the vicinity of the feed zone of the reinforcing fibers F is present on the pull-side 303 of the flight, and the molten resin M is present on the push-side 305 of the flight separately from each other, the molten resin M due to the rotational flow RF flows into a space between the pull-side 303 of the flight and the fiber bundle of the reinforcing fibers F, and enters the inside of the bundle of the reinforcing fibers F. Thus, opening of the fiber bundle can be promoted.

Moreover, in the present embodiment, the reinforcing fibers F receives the shearing force T1 in the groove width direction, and the shearing force T2 in the orientation opposite to that of the shearing force T1. Moreover, the reinforcing fibers F receives the shearing force T3. Thus, opening of the fibers can be further promoted by a strong agitation action.

Air Bubble Processing

In the embodiment described above, when it is detected that the preformed space S1 is filled with the molten resin M, the screw 10 shifts from the first normal rotation to the first reverse rotation, and from the second normal rotation to the second reverse rotation. Accordingly, air bubble processing is realized. With reference to FIG. 8, the air bubble processing will be described.

Figure 8A:
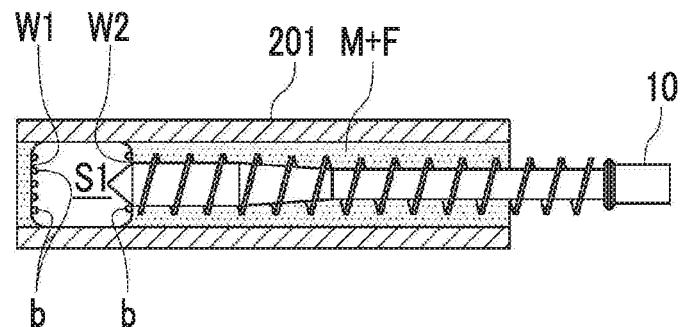
FIG. 8 is a view illustrating a procedure of air bubble processing performed when a space S1 is filled with a molten resin M.
Figure 8B:
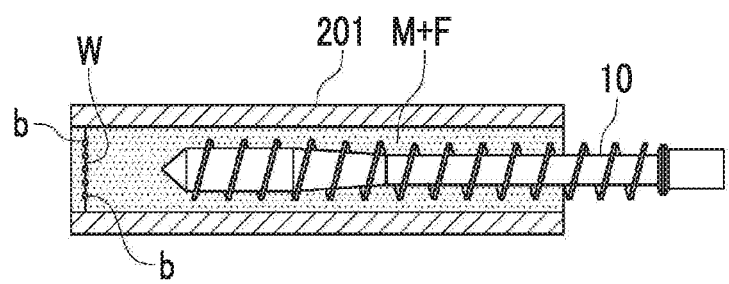

As illustrated in FIG. 8(a), in each of a wall face W1 and a wall face W2 of the molten resin M facing the space S1, there is a possibility that a gas component generated in accordance with forming of the space S1 becomes an air bubble b and is manifested. Consequently, as illustrated in FIG. 8(b), when the space S1 is only filled with the molten resin M, the air bubble b remains in an interface W of the wall face W1 and the wall face W2 without any change, and there are cases where the air bubble is present as a defect in the injection molding product.

Figure 8C:
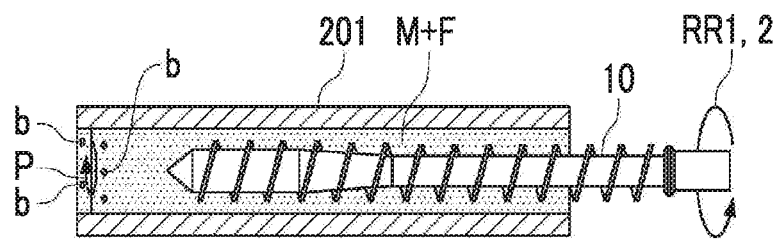

Incidentally, according to the present embodiment, when the screw 10 shifts from the first normal rotation NR1 to the first reverse rotation RR1, the pump effect of the screw 10 acts in a direction opposite to that at the time of the normal rotation, that is, the molten resin M flows backward to the screw 10 side. Therefore, the wall face W1 and the wall face W2 flow to the screw 10 side, and turbulence is generated in the interface of the wall face W1 and the wall face W2. Due to the turbulence in the interface, the air bubble b is deformed, is fragmented, and micronized. In addition, at the same time, as illustrated in FIG. 8(c), a torsional force P is applied to the interface W of the wall face W1 and the wall face W2. Accordingly, due to the behaviors, the air bubble b can be dispersed to the peripheral molten resins M.

In addition, at the same time as the reverse rotation, it is preferable that a prescribed advancing force is applied to the screw 10 and the screw 10 advances while reversely rotating. When the screw 10 reversely rotates, the molten resin M flows backward to the screw 10 side. Therefore, the pressure of the filling molten resin M is lowered, and there are cases where the gas component in the molten resin M is newly volatilized and air bubbles are generated. In contrast, when the screw 10 advances while reversely rotating, without lowering the pressure of the molten resin M, turbulence and torsion are generated in the interface of the wall face W1 and the wall face W2. Accordingly, the air bubble b can be dispersed to the peripheral molten resin M.

Example of Pattern of Forcible Retreat

The pattern of the forcible retreat described above is an example of the present invention, and the plasticizing step including the forcible retreat can be performed in a different pattern.

For example, as illustrated in FIGS. 9(a) to 9(e), when a forcible retreat FB is performed once, the screw 10 can be displaced to the measurement position.

Figure 10:
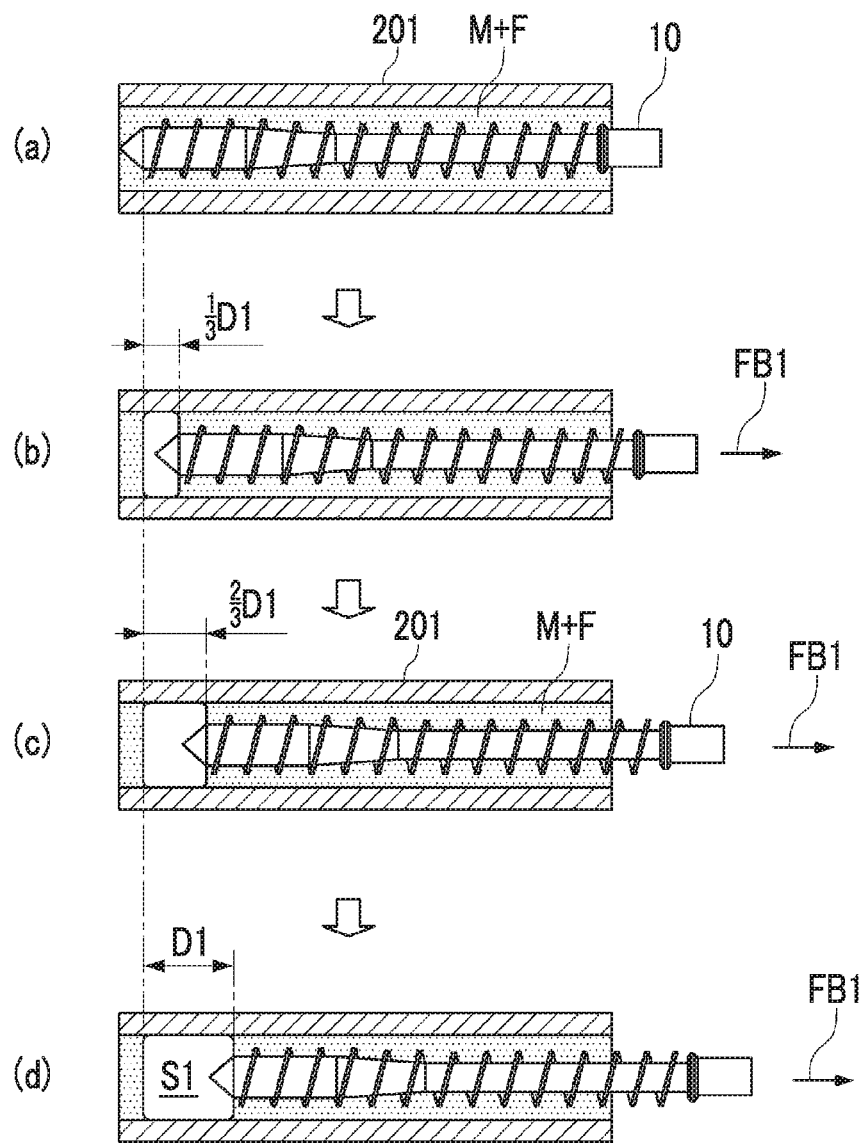
FIG. 10 is a view illustrating an example in which the screw intermittently and correctively retreats as much as prescribed strokes.

In addition, as illustrated in FIGS. 10(a) to 10(d), when the forcible retreat is performed as much as the prescribed stroke D1, the prescribed stroke D1 is segmented and the screw 10 can intermittently retreat, for example, in a manner in which the screw 10 retreats, is halted (FIG. 10(b)), retreats, is halt (FIG. 10(c)), and so on by ⅓×D1 for each thereof. The intermittent forcible retreat can be applied to each of forcible retreats in a pattern in which the screw 10 is displaced to the measurement position by performing a plurality times of forcible retreats illustrated in FIGS. 6(a) to 6(e), and the intermittent forcible retreat can also be applied to a pattern in which the screw 10 is displaced to the measurement position by performing one forcible retreat illustrated in FIGS. 9(a) and 9(b). In addition, the segmented distances of the prescribed stroke D1 in the intermittent forcible retreat may be uniform distances or distances which are partially or entirely different from each other. In addition, the retreat velocities in the intermittent forcible retreat may be uniform velocities or velocities which are partially or entirely different from each other (multi-stage velocity).

According to the intermittent forcible retreat, it is possible to expect that opening of the reinforcing fibers F is further promoted. That is, FIG. 11 illustrates a relationship between the shear velocity and the melt viscosity of a molten resin. As the shear velocity is lower, the viscosity becomes higher. When a case where a flow is caused in the molten resin M inside the screw groove 31 is postulated, at a moment when a force is applied in order to cause a flow in the molten resin from a state where there is no flow and the molten resin is halted, the molten resin behaves nearly like a solid. That is, according to the behavior at this moment, the shearing force applied to the surface of the molten resin is transmitted to the reinforcing fibers F inside the molten resin without being consumed for deformation of the molten resin. Thus, the fiber bundle of the reinforcing fibers F can be disentangled. Moreover, by continuously applying the shearing force to the molten resin, a high shearing force is added to the fiber bundle due to the high viscosity state in the low shear velocity range in the middle of acceleration, and by developing the flow of the molten resin, an agitation effect can be added to the disentangled fiber bundle. Thus, opening of the fiber bundle can be promoted.

In addition, the shearing force generated in the molten resin is the product of the melt viscosity value and the shear velocity value. However, as illustrated in FIG. 11, when the shear velocity is significant, the viscosity is low, and when the viscosity is high, the shear velocity is small. Thus, in order to acquire a significant shearing force, a condition in which the viscosity and the shear velocity are well balanced and have significant values is necessary. However, the melt viscosity is greatly influenced not only by the shear velocity but also by the type of the raw material resin and the temperature of the resin. Therefore, grasping the condition in which the viscosity and the velocity are well balanced and become significant requires the knowledge of the physical properties of the resin, is complicated, and is not easy. However, by performing the intermittent forcible retreat, the velocity is consecutively changed from a low velocity to a high velocity in the middle of forcible retreat acceleration. Therefore, when a field of a shearing force caused due to a combination of the viscosity and the shear velocity is consecutively and widely applied to the molten resin, it is possible to achieve the condition in which a high shearing force can be acquired. Accordingly, without the knowledge of the physical properties of the resin, it is possible to execute a forcible retreat condition in which a significant shearing force effective for opening the reinforcing fibers F can be applied.

Therefore, when the number of times of the moving out is increased, the shearing force and the agitation force effective for the fiber bundle inside the screw groove 31 can be repetitively added. Accordingly, the degree of opening the fiber bundle can be increased.

In addition, the velocity of the screw 10 when performing the intermittent forcible retreat is not limited to being uniform. The velocity can be changed. For example, in a case of the above-described example, the velocity of retreating by the stroke D1 in the first half can be raised, and the velocity thereof in the latter half can be lowered. The velocities can be set in the opposite manner. At the moment when the velocity is drastically changed from a high velocity to a low velocity or from a low velocity to a high velocity, similar to a case where a shearing force is applied in the above-described halted state, the molten resin behaves similarly to a solid. Therefore, when the velocity in the forcible retreat is changed, it is possible to add the shearing force and the agitation force effective for the fiber bundle inside the screw groove 31.

In addition, in a case where the screw 10 intermittently and forcibly retreats, the velocity of each retreat can be changed, for example, in a manner of a high velocity, a low velocity, a high velocity, a low velocity, and so on.

In addition, in a case where the screw 10 intermittently and forcibly retreats, the retreat control can also be performed in a consecutive or intermittent manner until the screw 10 reaches a velocity equal to or greater than the sufficient retreat velocity or a force equal to or greater than the forcible retreat force necessary to open the above-described reinforcing fibers F.

In addition, hereinbefore, when the forcible retreat is performed, the rotation of the screw 10 is halted. However, the screw 10 may forcibly retreat while normally rotating. In this case, the screw 10 can normally rotate throughout the entire period of the forcible retreat and can normally rotate by being limited to a part of the period of the forcible retreat. In addition, the normal rotation of the screw 10 for filling the space S1 or the space S2 after the forcible retreat is performed at the first retreat position or the second retreat position. However, the normal rotation of the screw 10 for filling the space S1 or the space S2 can be performed while advancing. In this case, the space S1 or the space S2 can be reduced due to the molten resin by the normal rotation of the screw 10, and the space S1 or the space S2 can be reduced by causing the screw 10 to advance at the same time. Thus, the space S1 or the space S2 can be filled in a short time, and productivity is improved. The advancing velocity of the screw 10 in this case may be approximately the same advancing velocity as the retreat velocity of the screw 10 due to the pressure of the resin, that is, a low velocity which does not reach the sufficient moving velocity necessary to perform opening.

An experiment for checking the effect of the present embodiment is performed.

Figure 15:
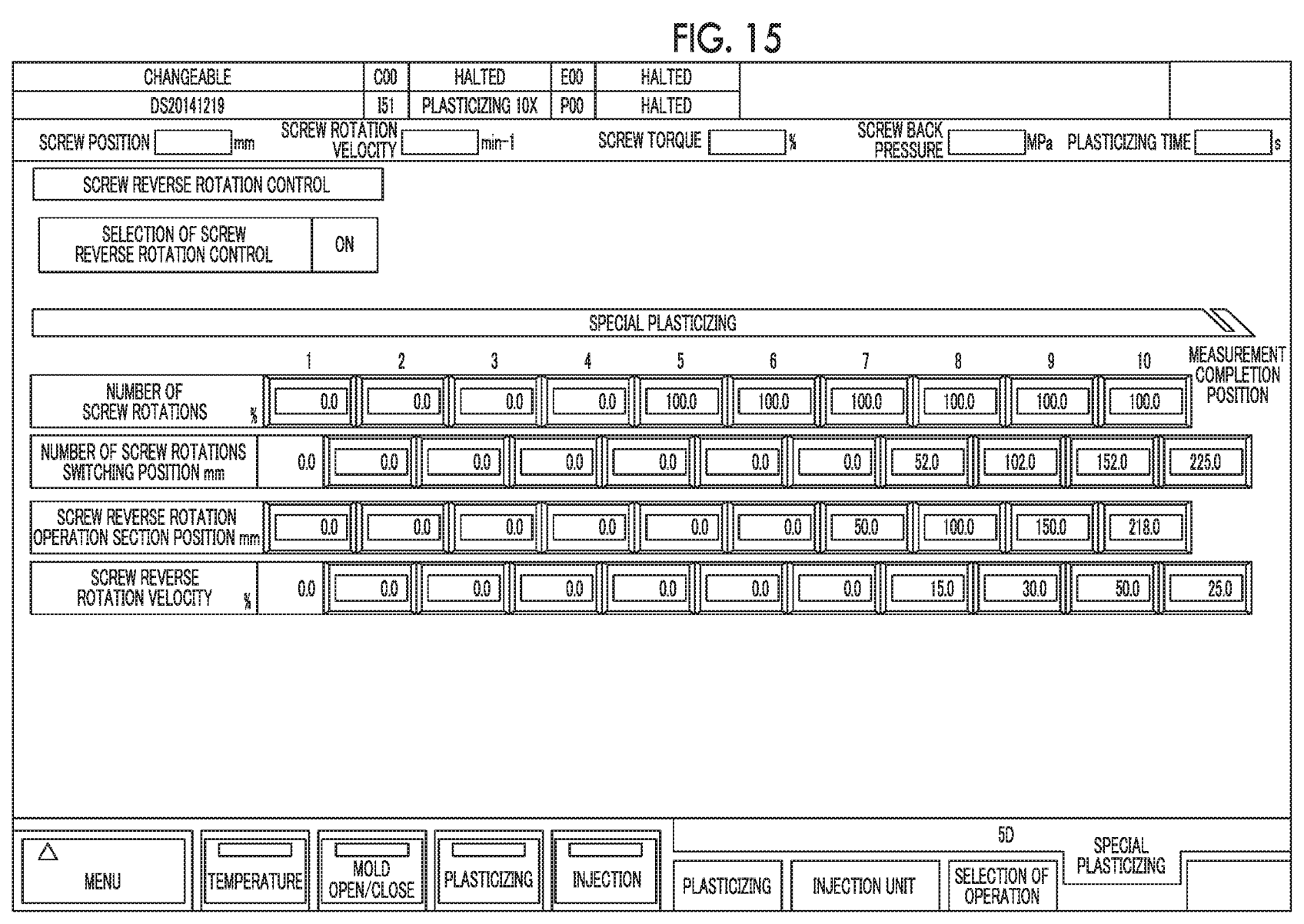

FIG. 15 illustrates a screw reverse rotation velocity setting screen which is a man-machine interface of a control device of the injection molding machine used in this experiment. In the screen, in order to allow a molding worker to compare other plasticizing conditions (the set value and the execution value), particularly the molten resin amount for filling the mold with respect to a measurement completion screw position for measuring through a retreat of the screw, a screw reverse rotation velocity setting portion through which the reverse rotation velocity of the screw can be input with an arbitrary value, and a plurality of reverse rotation operation section setting portions which set the switching position for setting the operation section of the reverse rotation operation are disposed.

The reverse rotation velocity setting portion and the reverse rotation operation section setting portion are provided such that the molding worker can compare other plasticizing conditions (the set value and the execution value), particularly the molten resin amount for filling the mold with respect to the measurement completion screw position for measuring through a retreat of the screw. In this screen, a plurality of the reverse rotation velocity setting portion are provided in a disposition corresponding to each of the reverse rotation operation sections such that the reverse rotation velocities can be set to the plurality of the reverse rotation operation sections. Meanwhile, in a case where the reverse rotation velocities are set to uniform reverse rotation velocities without changing based on the position, only one reverse rotation velocity setting portion may be disposed. In addition, in FIG. 15, in the screen for setting the condition of plasticizing (plasticizing condition setting screen), the reverse rotation velocity setting portion and the reverse rotation operation section setting portion are disposed. However, the reverse rotation velocity setting portion and the reverse rotation operation section setting portion may be provided in a screen different from the plasticizing condition setting screen or in a different input device provided in a different site. In addition, a change-over switch which switches between the control of measuring plasticizing by performing the reverse rotation operation, and the control of measuring plasticizing without performing the reverse rotation operation.

In addition, in the screw reverse rotation velocity setting screen, an operation condition setting portion for a raw material resin supply device and a reinforcing fiber supply device may be disposed and provided so as to be able to be compared with the set value of the reverse rotation velocity or the set value of the reverse rotation operation section.

In addition, in FIG. 15, in the screen, each of the reverse rotation operation sections can be individually set by the worker. However, in a case where the reverse rotation operation and the screw normal rotation operation are alternately and repetitively performed, that is, in a case where each of the reverse rotation operation sections may be equal to each other or in a case where each of the reverse rotation operation sections may be distributed in a pattern or a ratio determined in advance, the reverse rotation operation sections may be automatically calculated and set by the worker who only inputs the number of segmentations. In addition, this screen may be provided with an acceleration setting portion in which the acceleration of the reverse rotation operation can be input with an arbitrary value.

Figure 14A:
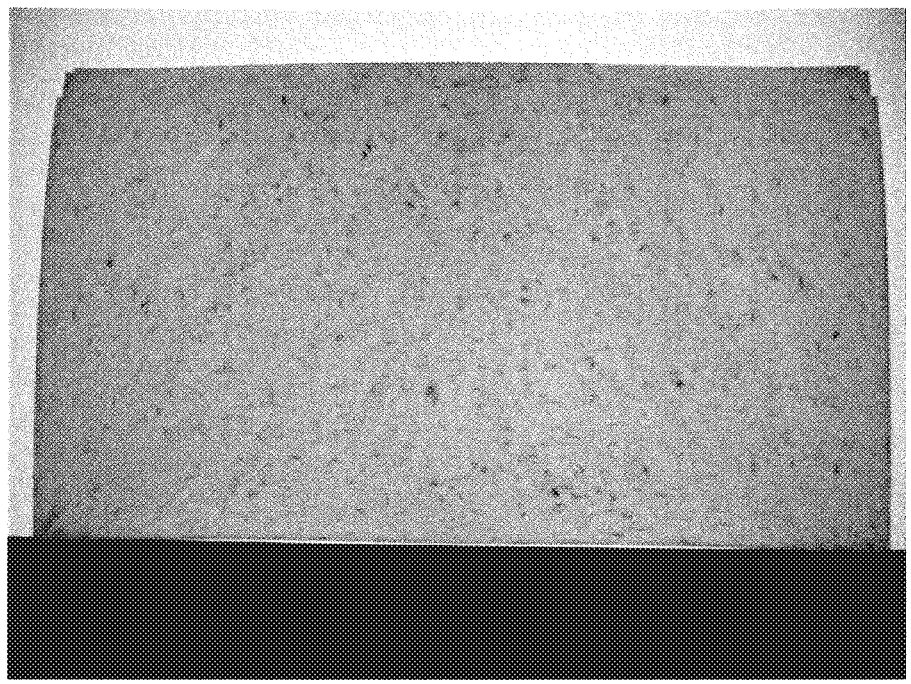
FIG. 14 is a view illustrating a result of an experiment checking the effect of the present embodiment.
Figure 14B:
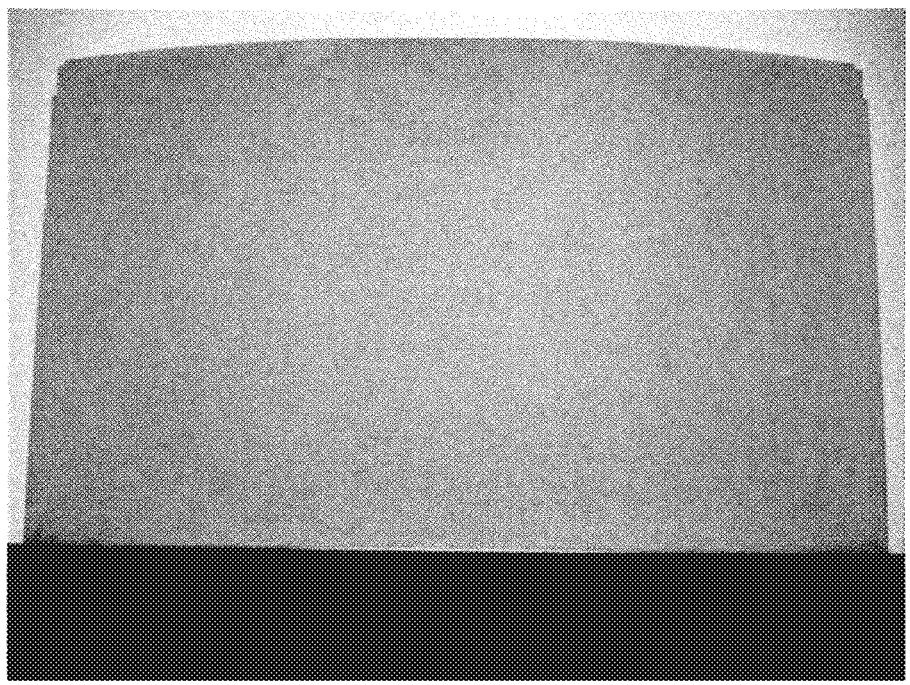

The result of this experiment is illustrated in FIGS. 14(*a*) and 14(*b*). FIG. 14(*a*) illustrates a surface of a fiber reinforcing resin (example in the related art) which is molded without performing the reverse rotation, and FIG. 14(*b*) illustrates a surface of a fiber reinforcing resin (example of the exemplary embodiment) which is molded by performing the forcible retreat in the patterns illustrated in FIGS. 3(*a*) to 3(*f*).

As illustrated in FIG. 14(*a*), in the example in the related art, many reinforcing fibers F in bundles are present, and the reinforcing fibers appear to be black dots in the surface of the molded product. In contrast, as illustrated in FIG. 14(*b*), in the example of the exemplary embodiment, there are little open-failed reinforcing fibers F in bundles. Therefore, the black dots as in the example in the related art do not appear in the surface.

In addition, regarding the rotation amount [mm] of the reverse rotation operation, there are cases where opening of the reinforcing fibers F is insufficient in a case where the rotation amount is less than any small one of π×D×(10° (opposite rotation angle)/360°) [mm] and 10 [mm]. It is considered because in a case where the rotation amount of the reverse rotation operation is less than the stroke of any small one of π×D×(10° (opposite rotation angle)/360°) [mm] and 10 [mm], inside the screw groove, since the entangled reinforcing fibers F cannot be stretched to a sufficient distance, the reinforcing fibers F which are bent and deformed due to the entanglement cannot be separated from each other by only being stretched so that the entanglement cannot be untangled and be opened. From this fact, it is preferable that the rotation amount of the reverse rotation operation of the screw 10 is equal to or greater than the rotation amount of any small one of π×D×(10° (opposite rotation) angle)/360°) [mm] and 10 [mm]. More preferably, it is preferable that the rotation amount of the reverse rotation operation is equal to or greater than the rotation amount of any small one of π×D×(20° (opposite rotation angle)/360°) [mm] and 20 [mm]. However, when the rotation amount of the reverse rotation operation is increased, the sufficiently entangled reinforcing fibers F can be separated from each other to a sufficient distance. However, the time required for the reverse rotation is elongated, and there are cases where the molten resin flows backward to the resin supply hopper 207 side and is spurted out from the resin supply hopper 207. Accordingly, the time required for the plasticizing step, that is, the time from the start to the completion of plasticizing is elongated, or the molding operation cannot be performed, thereby leading to deterioration of the productivity. From this fact, regarding the rotation amount of the reverse rotation operation, the number of rotations (the number of rounds of the screw) is preferably equal to or less than ten times, and is more preferably equal to or less than five times.

The similar result is obtained regarding the amount of one reverse rotation in a case where the normal rotation operation and the reverse rotation operation of the screw are alternately repeated, or in a case where the reverse rotation operation and the halt operation of the screw are alternately repeated. Thus, the rotation amount of the reverse rotation operation of the screw 10 is preferably equal to or greater than the stroke of any small one of π×D×(10° (opposite rotation angle)/360°) [mm] and 10 [mm]. Moreover, it is preferable that the number of rotations in the reverse rotation operation is equal to or less than ten rotations. More preferably, the rotation amount of the reverse rotation operation is equal to or greater than the rotation amount of any small one of π×D×(20° (opposite rotation angle)/360°) [mm] and 20 [mm], and it is most preferable to have a range equal to or less than five rotations.

In addition, it has been found that the effect of the present invention can be effectively achieved when the outer circumferential velocity of the screw 10 in the reverse rotation operation is equal to or greater than the velocity of any small one of 50 [mm/s] and 0.5×D [mm/s] (D is the inner diameter of the cylinder).

Incidentally, as widely known, the shearing force applied from the molten resin M to the reinforcing fibers F is proportional to the product of the viscosity of the molten resin M and the shear velocity (deformation velocity). Therefore, as the velocity applied to the molten resin M increases, the shearing force which functions as an opening force with respect to the reinforcing fibers F increases. In a case where the outer circumferential velocity is less than the velocity of any small one of 50 [mm/s] and 0.5×D [mm/s], inside the screw groove, a sufficient shearing force cannot be applied to the entangled reinforcing fibers F, and the fiber bundle cannot be disentangled. Therefore, in this case, by only generating a deviation among the entangled fiber bundles or gently deforming the fiber bundles, it is understood that the bonding and the entanglement of the fiber bundles cannot be untangled and be opened. In addition, from this fact, since the velocities (V3, −V3) of the rotational flow RF are the same as the reverse rotation velocity of the screw, when the velocities (V3, −V3) of the rotational flow RF inside the screw groove are equal to or greater than the velocity of any small one of 50 [mm/s] and 0.5×D [mm/s], it is considered to be effective for opening the reinforcing fibers F.

In addition, in a case where the acceleration of the retreat operation indicating the degree of change of the shear velocity is less than 50 (mm/s2), there are cases where opening of the reinforcing fibers F is insufficient. It is considered because since the molten resin M is easily deformed in a case where the change of the shear velocity is gradual, in a case where the acceleration of the reverse rotation operation is small such as less than (mm/s2), the molten resin M interposed between the fiber bundles is gradually deformed, and the shearing force is consumed for deformation of the molten resin M, thereby not effectively functioning for opening of the fiber bundles. From this fact, it is preferable that the acceleration of the reverse rotation operation is equal to or greater than 50 (mm/s2). The acceleration of the reverse rotation operation is more preferably equal to or greater than 100 (mm/s2). Moreover, the acceleration of the reverse rotation operation is most preferably equal to or greater than 200 (mm/s2). In a case where the retreat operation is performed at the acceleration equal to or greater than 200 (mm/s2), no opening failure of the reinforcing fibers F has occurred in all of the experiment conditions.

In addition, it is preferable that the acceleration distance (the circumferential direction) of the reverse rotation operation is less than the rotation amount of any small one of π×D×(10° (opposite rotation angle)/360°) [mm] and 10 [mm]. As described above, the lower limit value of the rotation amount with which the effect of the present invention can be achieved is the rotation amount of any small one of π×D×(10° (opposite rotation angle)/360°) [mm] and 10 [mm]. From this fact, when the acceleration requires the rotation amount of any small one of π×D×(10° (opposite rotation angle)/360°) [mm] and 10 [mm], the section for the reverse rotation operation performed at the reverse rotation velocity effective for opening of the reinforcing fibers F ends in an instant. The reason is that there are cases where the level satisfying the quality of the molded product required for a user is not attained depending on the raw material resin.

Hereinbefore, the present invention has been described based on the embodiment. However, without departing from the gist of the present invention, the configuration exemplified in the embodiment can be adopted or rejected and can be suitably changed to a different configuration.

For example, as the patterns of the reverse rotation operation, four patterns of the reverse rotation operation are broadly illustrated such as the essential reverse rotation operation, the intermittent reverse rotation operation, the air bubble processing, and the reverse rotation operation combined with the forcible retreat of the screw 10. In the patterns, the reverse rotation operation may be performed by combining a plurality of arbitrary patterns of the reverse rotation operation together in an arbitrary order. The screw 10 of the injection molding machine to which the present invention is applied is not limited to the two-stage-type design illustrated in the present embodiment. The screw 10 may be designed to be a three-stage-type including a third stage additionally provided with a feed zone, a compression zone, and a metering zone on the downstream side of the second stage. In this case, in the third stage, a function such as adding a functional member to the molten resin or deairing a volatile substance may be added.

In addition, the present invention can be applied to a plasticizing unit which is a type of supplying the resin pellets P and the reinforcing fibers F from the same hopper by using a one-stage-type screw 10 having the feed zone, the compression zone, and the metering zone one each. In addition, the present invention can be applied to the injection molding machine which is referred to as the preplasticating method individually including a plasticizing apparatus provided with a screw, and an injection apparatus. In the molding machine, the resin pellets P and the reinforcing fibers F are plasticized in the plasticizing apparatus, and the result thereof is sent to a plunger of the injection apparatus. Thereafter, the plunger advances so as to perform injection molding. The present invention can be applied to the plasticizing apparatus of the injection molding machine adopting the preplasticating method. Usually, the plasticizing apparatus adopting the preplasticating method does not have a structure or is controlled such that the screw can advance and retreat. However, in a case of applying the present invention of a pattern in which the forcible retreat of the screw and the reverse rotation of the screw are combined together, the structure and the controlling can also be realized in the plasticizing apparatus adopting the preplasticating method, in which the screw can advance and retreat.

In the plasticizing unit 200 of the present invention, the fiber supply device 213 and the resin supply hopper 207 are fixed to the heating cylinder 201. However, a movable-type hopper which moves in the axial direction of the screw 10 can be adopted. Particularly, in a case where a multi-shaft-type measuring feeder is used in the fiber supply device 213, a plurality of feeders are disposed in parallel so as to be interlocked with each other in the longitudinal direction of the screw 10, and a feeder supplying the reinforcing fibers F in the plasticizing step may be used in an exchangeable manner. Specifically, when the plasticizing step starts, the reinforcing fibers F are supplied from the feeder disposed on the tip side of the screw 10, and in accordance with the retreat of the screw 10 in the plasticizing step, the feeders supplying the reinforcing fibers F may be sequentially switched toward the back side such that the relative positions of the screw 10 and the feeder screw discharging the fibers do not change. Accordingly, despite the change of the relative positions of the heating cylinder 201 and the screw 10 due to the advance of the screw 10 when the screw 10 retreats and injection is performed, the position of supplying the reinforcing fibers F to the screw 10 can be uniform.

Specifically, the position of the fiber supply feeder screw when plasticizing is completed, that is, the position of the screw groove of the backmost portion filled with the reinforcing fibers F can coincide with the position of the fiber supply feeder screw at the time of the next start of plasticizing, at the screw position advancing due to injection. Therefore, the reinforcing fibers F can be consecutively supplied to the screw groove on the downstream side beyond the fiber supply device 213, and it is effective to prevent or restrain the generation of a region which is not filled with the reinforcing fibers F inside the groove of the screw 10 on the downstream side beyond the fiber supply device 213.

In addition, the method of switching the feeder screw may be performed through simple ON/OFF controlling, and the feeder screw may be changed in association with the number of rotations of the screw feeders adjacent to each other. Specifically, the number of rotations of the screw feeders on the downstream side is gradually reduced in accordance with the retreat of the screw and the number of rotations of the screw feeders on the back side may be gradually increased.

In addition, the reinforcing fibers F may be supplied to the heating cylinder 201 not only in the injecting step or the plasticizing step but also in a pressure keeping step or an injection standby step (the period from the completion of the plasticizing step to the start of the injecting step), for example. In the pressure keeping step or in the injection standby step, the screw 10 does not rotate, and advance or retreat. Accordingly, the vent hole is not intermittently sealed due to the movement of the flight. Therefore, the reinforcing fibers can be stably supplied to the inside of the groove of the screw 10.

In addition, not only the reinforcing fibers F but also reinforcing fibers F in which a powder-like or pellet-like raw material resin is mixed may be supplied to the fiber supply device 213. In this case, even though the molten resin M is unlikely to infiltrate between the reinforcing fibers F, the mixed raw material resin is molten in the bundle of the reinforcing fibers F and enters the inside of the fiber bundle. Thus, disentanglement of the fiber bundle can be promoted.

In addition, the resin and the reinforcing fibers applied to the present invention are not particularly limited. Known materials including a general resin such as polypropylene and polyethylene; a known resin such as engineering plastic including polyamide and polycarbonate; and a known reinforcing fiber such as a glass fiber, a carbon fiber, a bamboo fiber, and a hemp fiber are widely included. In order to remarkably achieve the effect of the present invention, it is preferable to target a fiber reinforcing resin which has a high content rate such that the content of the reinforcing fibers is equal to or greater than 10%. However, when the content rate of the reinforcing fibers exceeds 70%, transport resistance of the reinforcing fibers inside the screw groove increases. Therefore, in the present invention using the flight which has a small diameter and comparatively low ability of transporting the resin, it is difficult to transport the reinforcing fibers, and thus, there is a possibility that the reinforcing fibers block the inside of the screw groove and cause vent-up in the vent hole portion. Therefore, the reinforcing fibers applied to the present invention are preferable to have the content rate ranging from 10 to 70% and more preferable to range from 15 to 50%.

In addition, the effect of the present invention can be remarkably achieved in molding of using the reinforcing fibers, particularly of which the fiber lengths are equal to or greater than 6 mm. Furthermore, the effect can be remarkably achieved in molding of using the chopped fibers of which the fiber lengths are equal to or greater than 9 mm or the reinforcing fibers in the roving state.

In addition, in the present invention, as the added components, instead of the reinforcing fibers, or in a combination with the reinforcing fibers or the raw material resin, the quality and the value of the molded product can be improved by uniformly dispersing additives, a filling substance, and the like in the molten resin M. For example, in a case where the raw material resin is supplied through the supply hole of the heating cylinder on the upstream side and the reinforcing fibers are supplied through the supply hole on the downstream side, instead of the reinforcing fibers or together with the reinforcing fibers, the additives and/or the filling substance may be supplied through the supply hole on the downstream side. In addition, together with the raw material resin, the additives and/or the filling substance may be supplied through the supply hole of the heating cylinder on the upstream side and the reinforcing fibers may be supplied through the supply hole on the downstream side. Moreover, in a case where the reinforcing fibers and the resin raw material are supplied through the same supply hole of the heating cylinder, instead of the reinforcing fibers, or together with the reinforcing fibers, the additives and or the filling substance may be supplied to the heating cylinder, and the additives and/or the filling substance may be supplied to the heating cylinder through both the supply holes on the upstream side and the downstream side. Moreover, the methods may be suitably combined together. The additives and the filling substance may be supplied to the heating cylinder, for example, the additives may be supplied through the supply hole on the upstream side, and the filling substance may be supplied to the heating cylinder through the supply hole on the downstream side.

As the additives of the present invention, additives which allows moldability and thermal stability when the thermoplastic resin is molded, or additives which improve durability under the environment where a thermoplastic resin molded product is used. Specifically, a stabilizing agent (an antioxidant, a thermal degradation inhibitor, and a hydrolysis inhibitor), a light stabilizer, an ultraviolet absorber, a lubricant, a release agent, a plasticizer, a sliding property improver, a flame retardant, a foaming agent, an antistatic agent, a dispersing agent, a nucleating agent, a coloring agent, and the like are included. The additives may be used in one type or by mixing two or more types.

In addition, as the filling substance of the present invention, filling substances for improving various characteristics such as the strength, the rigidity, heat resistance, and the like of the thermoplastic resin molded product are adopted and usually used filling substances are adopted. Specifically, examples of the filling substance include a glass-based toughening agent such as glass beads, glass flakes, and glass balloons; a silicate-based toughening agent such as talc, clay, mica, wollastonite, montmorillonite, magnesium silicate, and aluminum silicate; a sulfate-based toughening agent such as barium sulfate; a carbonate-based toughening agent such as calcium carbonate, magnesium carbonate, and zinc carbonate; a hydroxide toughening agent such as aluminum hydroxide, magnesium hydroxide, and calcium hydroxide; an oxide toughening agent such as silica, alumina, titanium oxide, antimony oxide, zinc oxide, magnesium oxide, calcium oxide, and silicon oxide; a carbon-based toughening agent such as carbon black, graphite, and carbon fibers; a metal-based toughening agent such as fibers, powder and flakes of aluminum, steel, iron, boron, and stainless steel; silicon carbide; a boron nitride or potassium titanate whisker; an aluminum borate whisker; a coupling agent; an acid-modified resin binder agent; a rubber component; and the like.

In the present invention, the filling substances may be used in one type or by mixing two or more types. In addition, particularly in a case where the resin raw material resin is supplied through the supply hole of the heating cylinder on the upstream side and the added components are supplied through the supply hole on the downstream side, the time the added components receive heat inside the screw groove can be shortened. Therefore, even low heat-resistant added components such as wood pulp, paper waste, used paper, and wool can be uniformly dispersed in the molten resin while thermal deterioration is restrained.

REFERENCE SIGNS LIST 1 injection molding machine
10 screw
21 first stage
22 second stage
23 feed zone
24 compression zone
25 feed zone
26 compression zone
27 first flight
28 second flight
28A side face
28B side face
31 screw groove
31A bottom face
50 control section
70 metering zone
71 metering zone
100 mold clamping unit
101 base frame
103 fixed mold
105 stationary platen
107 slide member
109 movable mold
111 movable platen
113 hydraulic cylinder
115 tie bar
117 hydraulic cylinder
119 ram
121 male screw portion
123 nut
200 plasticizing unit
201 heating cylinder
201A inner wall face
203 discharge nozzle
206 vent hole
207 resin supply hopper
208 supply hole
209 first electric motor
211 second electric motor
213 fiber supply device
214 shaft-type screw feeder
215 pellet supply device
218 roving cutter
300 screw
301 screw groove
303 pull-side 305 push-side
306 flight
310 cylinder
F reinforcing fibers
M molten resin
b air bubble
P resin pellet
S1 space
S2 space
W1 wall face
W2 wall face
W interface

The invention claimed is:

1. An injection molding method for a resin that contains an added component, the method comprising:
   a plasticizing step of:
      supplying a resin raw material and the added component which is reinforcing fibers, to a cylinder in which the resin raw material is melt to generate a molten resin and the added component is supplied in the molten resin to form a molten resin containing the added component, the cylinder being equipped with a screw and a vent hole, the screw being able to rotate normally and reversely around a rotating axis,
      transporting the molten resin containing the added component to a downstream side of the cylinder, and placing the screw at the downstream side of the cylinder,
      forcibly retreating the screw placed at the downstream side of the cylinder without rotating the screw, as a first retreat operation, to form a first space at a downstream side of the screw in which no molten resin containing the added component is present,
      after the first retreat operation, normally rotating the screw, as a first normal rotation operation, and filling the first space with the molten resin containing the added component,
      after the first normal rotation operation, reversely rotating the screw, as a first reverse rotation operation, to apply a shearing force to the molten resin containing the added component in a direction different from a direction at the first normal rotation operation, and dispersing the added component in the molten resin,
      after the first reverse rotation operation, forcibly further retreating the screw without rotating the screw, as a second retreat operation, to form a second space at the downstream side of the screw in which no molten resin containing the added component is present, and placing the screw to a predetermined position,
      after the second retreat operation, normally rotating the screw, as a second normal rotation operation, and filling the second space with the molten resin containing the added component,
      after the second normal rotation operation, reversely rotating the screw, as a second reverse rotation operation to apply a shearing force to the molten resin containing the added component in a direction different from a direction at the second normal rotation operation, and further dispersing the added component in the molten resin; and
   an injecting step of injecting the molten resin containing the added component at the downstream side of the screw into a cavity,
   wherein
   in a plasticizing step, the added component is supplied to the cylinder through the vent hole when the molten resin generated in the cylinder is transported under the vent hole, and in the first and second reverse rotation operations, the screw reversely rotates at prescribed timing and for a prescribed period.

2. The injection molding method according to claim 1, wherein in the first and second reverse rotation operations, the screw rotates reversely as much as a prescribed rotation angle or a prescribed time.

3. The injection molding method according to claim 2, wherein in the first and second reverse rotation operations, the prescribed rotation angle or the prescribed time is segmented and the screw rotates reversely in a consecutive or intermittent manner.

4. The injection molding method according to claim 1, wherein each of the first and second reverse rotation operations continues until at least a prescribed reverse rotation velocity or prescribed reverse rotation torque is attained.

5. The injection molding method according to claim 4, wherein each of the first and second reverse rotation operations continues in a consecutive or intermittent manner until at least the prescribed reverse rotation velocity or the prescribed reverse rotation torque is attained.

6. The injection molding method according to claim 1, wherein in the plasticizing step, the first and second normal rotation operations of normally rotating the screw and the first and second reverse rotation operations are alternately performed.

7. The injection molding method according to claim 1, wherein in the plasticizing step, each of the first and second retreat operations of forcibly retreating the screw is performed as much as prescribed strokes or the prescribed time.

8. The injection molding method according to claim 7, wherein in the first and second retreat operations, the prescribed strokes or the prescribed time is segmented and the screw is forcibly retreated in a consecutive or intermittent manner.

9. The injection molding method according to claim 1, wherein the plasticizing step further includes steps of halting the screw as first and second screw halt operations, and
   the first and second normal rotation operations of normally rotating the screw and the first and second screw halt operations are alternately performed.

10. The injection molding method according to claim 1, wherein a content rate of reinforcing fibers in the added component is in a range between 10% and 70%.

11. The injection molding method according to claim 1, wherein in the plasticizing step, by the first and second reverse rotation operations, a flow of the molten resin containing the added component is caused in a direction opposite to a direction at the first and second normal rotation operations.

12. The injection molding method according to claim 11, wherein a shearing force applied to the molten resin containing the added component at the first and second normal rotation operations and the shearing force applied to the molten resin containing the added component at the first and second reverse rotation operations are oriented opposite to each other.

13. The injection molding method according to claim 1, wherein in the first reverse rotation operation and the second reverse rotation operation, the outer circumferential velocity is equal to or greater than a velocity of 100 mm/s.

14. The injection molding method according to claim 13, wherein in the first reverse rotation operation and the second reverse rotation operation, the outer circumferential velocity is equal to or greater than a velocity of 200 mm/s.

15. The injection molding method according to claim 1, wherein each of the reinforcing fibers has a fiber length equal to or greater than 3 mm, the screw has a first stage provided on an upstream side of the screw and a second stage leading to the first stage and provided on the downstream side of the screw, the first stage including a feed zone, a compression zone, and a metering zone in order from the upstream side of the screw, and the second stage including a feed zone, a compression zone, and a metering zone in order from the upstream side of the screw, the reinforcing fibers being supplied to the feed zone in the second stage through the vent hole, in the first and second reverse rotation operations, an acceleration distance in a circumferential direction is less than a rotation amount of $\pi \times D \times (10°/360°)$ mm wherein D indicates an inner diameter of the cylinder and 10° indicates an amount of an opposite rotation angle, or a rotation amount of 10 mm, whichever smaller, and in the first and second reverse rotation operations, an outer circumferential velocity of the screw is equal to or greater than a velocity of 50 mm/s or a velocity of 0.5×D mm/s wherein D indicates the inner diameter of the cylinder, whichever smaller.

16. The injection molding method according to claim 1, wherein in the second retreat operation of the plasticizing step, the second space is formed at an upstream side of the cylinder relative to the first space formed in the first retreat operation, and in the first and second retreat operations of the plasticizing step, a retreat velocity of the screw is set to be equal to or greater than a retreat velocity of the screw due to a resin pressure of the molten resin containing the added component.

17. The injection molding method according to claim 16, wherein in the plasticizing step, the resin raw material is supplied to the cylinder through a resin hopper arranged at the upstream side of the cylinder and the added component is supplied to the cylinder through a fiber supply device arranged at a downstream side of the resin hopper, and the molten resin containing the added component is transported from the upstream side of the cylinder to the downstream side of the cylinder by normally rotating the screw, and the screw is advanced to be placed at the downstream side of the cylinder while normally rotating the screw, before the first retreat operation.

18. The injection molding method according to claim 1, wherein if an air bubble is generated in the first and second spaces formed in the first and second retreat operations, in the first and second reverse rotation operations of the plasticizing step, a torsional force is applied to the air bubble by reversely rotating the screw to disperse the air bubble to the molten resin containing the added component.

* * * * *